US008014118B2

(12) United States Patent
Ikegami et al.

(10) Patent No.: US 8,014,118 B2
(45) Date of Patent: Sep. 6, 2011

(54) LOAD DRIVING CIRCUIT, DRIVER IC HAVING A LOAD DRIVING CIRCUIT, AND PLASMA DISPLAY PANEL HAVING A DRIVER IC

(75) Inventors: Koji Ikegami, Nagano (JP); Hideto Kobayashi, Nagano (JP); Hitoshi Sumida, Nagano (JP); Hiroshi Shimabukuro, Nagano (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 63 days.

(21) Appl. No.: 12/071,690

(22) Filed: Feb. 25, 2008

(65) Prior Publication Data

US 2008/0203926 A1 Aug. 28, 2008

(30) Foreign Application Priority Data

Feb. 27, 2007 (JP) ................................ 2007-048113

(51) Int. Cl.
*H02H 9/00* (2006.01)

(52) U.S. Cl. ........................................ 361/111; 361/56

(58) Field of Classification Search .................... 361/56, 361/86, 87, 91.1, 111
See application file for complete search history.

(56) References Cited

U.S. PATENT DOCUMENTS 4,500,801 A * 2/1985 Janutka ........................ 327/377
5,006,736 A * 4/1991 Davies ......................... 327/428
5,612,582 A * 3/1997 Shichi et al. .................. 307/130
6,370,040 B2 * 4/2002 Hosotani et al. ................ 363/19
6,459,324 B1 * 10/2002 Neacsu et al. ................ 327/379
2006/0126253 A1 * 6/2006 Urakabe et al. ............... 361/118

FOREIGN PATENT DOCUMENTS

JP 03-247114 11/1991
JP 04-322123 11/1992
JP 08-308143 11/1996
JP 2003-273714 9/2003

* cited by examiner

*Primary Examiner* — Danny Nguyen
(74) *Attorney, Agent, or Firm* — Rabin & Berdo, P.C.

(57) ABSTRACT

A load driving circuit in which a load is connected to the connecting point of transistors as low-side and high-side main switch elements that have a totem pole structure and are connected between a pair of drive voltage supply lines. A protection circuit section is provided for the high-side transistor. In the protection circuit section, a resistor as a voltage control element is provided for a MOSFET as an overvoltage prevention switch and a capacitor is connected between the gate and the drain of the MOSFET.

36 Claims, 20 Drawing Sheets

LOAD DRIVING CIRCUIT, DRIVER IC HAVING A LOAD DRIVING CIRCUIT, AND PLASMA DISPLAY PANEL HAVING A DRIVER IC

BACKGROUND OF THE INVENTION

1. Field of the Invention

The present invention relates to a load driving circuit, a driver IC having a load driving circuit, and a plasma display panel having a driver IC.

2. Description of the Related Art

Nowadays, plasma display panels (hereinafter abbreviated as PDPs), which enable size increases and thickness and weight reduction, are attracting much attention as display devices used in TV receivers and personal computers. And the tendencies toward screen size to 50 inches or more and increases in resolution as exemplified by the spread of full Hi-Vision TV receivers, are accelerating. Accordingly, panel driving circuits are now required to carry increased drive currents and to perform high-speed switching operations. For example, a voltage of 140 V is switched at as high a speed as 60 ns. An instantaneous current flowing in such a case is estimated as follows by assuming a triangular wave. Assume that the capacitance per scanning line of a panel is 250 pF. Since the number of full Hi-Vision scanning lines is 1,080, an instantaneous current is calculated as 2×(140 V×250 pF×1,080 lines)/60 ns=1,260 A. In an actual circuit, such a large instantaneous current is not measured because many resistance components and inductance components are involved and hence temporal deviations occur between circuit blocks. However, the probability that a large instantaneous current will cause noise or an erroneous operation is high FIG. 20 shows a general configuration of an exemplary PDP driving device. For the sake of simplicity, this PDP driving device is for a 2-electrode PDP.

The driving device for a PDP 700 is composed of plural scan driver ICs (integrated circuits) 800-1, 800-2, 800-3, . . . , **800-*k*, data (address) driver ICs 900-1, 900-2, 900-3, . . . , 900-*l***, etc. (k and l are arbitrary numbers).

Each of the scan driver ICs 800-1 to **800-*k* drives plural scan/maintaining electrodes 911 and each of the data (address) driver ICs 900-1 to 900-*l* drives plural data electrodes 912 which correspond to the respective colors R, G, and B. The scan/maintaining electrodes 911 and the data electrodes 912** are arranged perpendicularly to each other in lattice form and discharge cells (not shown) are disposed at their crossing points.

For example, in the case of XGA (extended video graphics array) in which the PDP 700 has 1,024×768 pixels, 12 scan driver ICs 800-1 to **800-*k* are provided (k=12) if each scan driver can drive 64 scan/maintaining electrodes 911**.

In displaying an image, data on the data electrodes 912 are written to the discharge cells by the scan driver ICs 800-1 to **800-*k* and the data (address) driver ICs 900-1 to 900-*l* while a scan is performed from one scan/maintaining electrode 911 to another (an address discharge period) and the discharges are maintained by supplying discharge maintaining pulses several times to the scan/maintaining electrode 911** (a discharge maintaining period).

FIG. 11 is a circuit diagram showing a load driving circuit that is part of each scan driver IC 800 for the PDP 700 shown in FIG. 20. This circuit has an output circuit section 101 having a totem pole structure between a pair of drive voltage supply lines, a level shifter circuit 102, a control circuit 103, and a protection circuit section 104. The output circuit section 101 is configured in such a manner that a totem pole circuit having two n-channel IGBTs (insulated gate bipolar transistors, hereinafter referred to as transistors) N1 and N2 which serve as low-side and high-side main switch elements and allow passage of a large current per unit area is connected between a drive voltage supply terminal 105 to which a first drive voltage VDH is supplied and a ground terminal 106 to which a second drive voltage (GND) is supplied, and that a DC output Do is supplied to the load from an output terminal 107. A low-side diode D1 is connected, in opposite polarity, between the drain and the source of the low-side transistor N1. A high-side diode D2 is connected, in opposite polarity, between the drain of the high-side transistor N2 and the output terminal 107, and the source of the high-side transistor N2 is connected to the output terminal 107 via a forward diode D3.

The level shifter section 102 is composed of n-channel MOS (metal-oxide-semiconductor) field-effect transistors (hereinafter abbreviated as MOSFETs) N3 and N4 and p-channel MOSFETs P1 and P2. The sources of the MOSFETs P1 and P2 are connected to the high-side drive voltage supply terminal 105. The gate of the MOSFET P1 is connected to the drain of the MOSFET P2, and the drain of the MOSFET P1 is connected to the gate of the MOSFET P2. The drain of the MOSFET P1 is connected to the drain of the MOSFET N3, and the drain of the MOSFET P2 is connected to the drain of the MOSFET N4. The sources of the MOSFETs N3 and N4 are connected to the ground terminal 106. The level shifter section 102 outputs a control signal for controlling the gate voltage of the transistor N2 of the output circuit section 101 as a high-side signal from an output point which is the connecting point of the drains of the MOSFETs P1 and N3.

The control circuit 103 is connected to the gate electrode of the transistor N1 of the output circuit section 101 and supplies it with a control signal as a low-side signal. The control circuit 103 is also connected to the gates of the MOSFETs N3 and N4 of the level shifter section 102 and supplies them with low-voltage control signals for controlling the gate voltages of the MOSFETs N3 and N4, whereby the level shifter circuit 102 supplies the high-side signal to the gate electrode of the transistor N2 of the output circuit section 101. To supply a first drive voltage and a second drive voltage alternately to the load which is connected to the output terminal 107, the low-side signal and the high-side signal are supplied to the output circuit section 101 as such control voltages as turn on and off the transistors N1 and N2 complementarily. To provide high impedance for the output terminal 107, the low-side signal and the high-side signal may be supplied as such control voltages as turn off both of the transistors N1 and N2.

In supplying a first drive voltage and a second drive voltage to the load alternately, if the transistors N1 and N2 which constitute a series circuit are turned on simultaneously, the pair of drive voltage supply lines are short-circuited by the transistors N1 and N2 (arm short-circuit state). An arm short-circuit not only increases the power consumption of the output circuit section 101, but also may destroy the devices constituting the output circuit section 101 and the load itself connected to it.

In view of the above, the control circuit 103 gives an on/off time difference (dead time) to the low-side signal and the high-side signal (two control signals) so that the level of one control signal changes from the low level to the high level after a lapse of a prescribed time from a change of the level of the other control signal from the high level to the low level and vice versa. The dead time is set taking into consideration the switching characteristics of the transistors N1 and N2 and the load drive characteristic.

Incidentally, in the conventional load driving circuit, when the high-side transistor N2 is on and the output terminal 107 is outputting a high-level D0 output D0, there may occur an event that the potential of the output terminal 107 falls steeply to the ground potential (GND) due to an external surge voltage or noise produced by switching of a capacitive or inductive load as shown in FIG. 12.

In such a case, if the protection circuit section 104 is not provided, the gate-source voltage Vgs of the high-side transistor N2 becomes higher than an ordinary operation voltage to increase the current flowing through the transistor N2. If this state continues and the transistor N2 is latched up, the transistor N2 may be destroyed due to overcurrent heating.

Where the protection circuit section 104 is not provided, formerly, to make the high-side transistor N2 less prone to be destroyed, the area of the transistor N2 is made large and the breaking resistance of the transistor N2 itself is thereby increased. However, in the case of a driver IC having the load driving circuit, increase in the scale of the load driving circuit is not preferable in terms of cost reduction. Therefore, the protection circuit section 104 as described below is provided to protect the transistor N2 of the output circuit section 101 from overcurrent breaking.

The protection circuit section 104 is composed of a Zener diode D4 for protecting the gate electrode of the transistor N2, a resistor R0 for reducing the gate voltage, a p-channel MOSFET P3, and its gate resistor R1. The parallel circuit of the Zener diode D4, the resistor R0, and the MOSFET P3 is connected between the gate and the source of the transistor N2. When the potential Do of the output terminal 107 varies, the MOSFET P3 is turned on instantaneously because of its own gate-drain parasitic capacitance and the control voltage for the transistor N2 is thereby lowered, whereby occurrence of an overcurrent is prevented.

For example, JP-A-03-247114 discloses, as a technique similar to the above protection circuit section 104, an overcurrent protection circuit for an inverter semiconductor device that is a switching power device. In this protection circuit, when the Zener voltage of a Zener diode which is connected to the gate is exceeded, an auxiliary transistor of the protection circuit is turned on, whereby the gate-source voltage of the power device is lowered to a prescribed level.

JP-A-04-322123 discloses circuits in which when a gate-source control voltage of a power device such as an IGBT exceeds a Zener voltage, a MOSFET or a transistor connected between the gate and the source is turned on, whereby the gate-source voltage is held at the Zener voltage. In a load driving circuit shown in FIG. 1 of JP-A-04-322123, when the load current increases and a voltage exceeding a Zener voltage is applied between the gate and the source, a current flows through the Zener diode and a capacitor connected between the gate and the source is charged. A MOSFET is turned on and a gate current starts to flow upon the start of the charging. The control voltage is thus limited to approximately the Zener voltage.

JP-A-2003-273714 discloses a load driving circuit having the above-described protection circuit section 104 shown in FIG. 11. There is a statement to the effect that an arm short-circuit of the totem pole circuit can be prevented reliably without increasing the number of components or the circuit size.

As described above, in the protection circuit section 104 having the configuration shown in FIG. 11, when the potential of the output terminal 107 falls steeply due to an external surge or noise, the overvoltage prevention switch (MOSFET P3) which is parallel with the resistor R0 and the Zener diode D4 is turned on instantaneously. However, since in general its gate-drain parasitic capacitance is very small, if the gate voltage of the high-side transistor N2 jumps to a large extent, the instantaneous turning-on of the MOSFET P3 is insufficient to lower the gate voltage of the transistor N2 to a steady-state voltage level. Conversely, when the potential of the output terminal 107 rises rapidly, a similar phenomenon occurs in the low-side main switching element N1. That is, there is a problem that the MOSFET P3 of the protection circuit section 104 cannot be kept on for a sufficiently long time to protect the high-side transistor N2 or the low-side transistor N1.

SUMMARY OF THE INVENTION

The invention has been made in view of the above problems, and an object of the invention is therefore to provide a load driving circuit capable of protecting a main switch element of an output circuit section from being destroyed due to an overcurrent as well as to a semiconductor device having such a load driving circuit.

To attain the above object, one aspect of the invention provides a load driving circuit in which a totem pole structure including a series connection of a low-side main switch element and a high-side main switch element is formed between a pair of drive voltage supply lines, the connecting point of the two main switch elements is connected to an output terminal, and a load is connected to the output terminal. In the load driving circuit, an overvoltage prevention switch is provided so as to connect a control electrode and a low-potential-side control subject electrode of one (called "main switch element A) of the two main switch elements. And voltage control of the overvoltage prevention switch is provided by a control circuit so as to connect a control terminal of the overvoltage prevention switch to the low-potential-side control subject electrode of the main switch element A and to connect the control terminal of the overvoltage prevention switch to the control electrode of the main switch element A, respectively.

The voltage control circuit turns on the overvoltage prevention switch only in a prescribed period of a period when the potential of the output terminal varies. The term "prescribed period" means a potential fall period of the potential variation period in the case where the main switch element A is the high-side one and a potential rise period of the potential variation period in the case where the main switch element A is the low-side one.

To attain the above object, another aspect of the invention provides a load driving circuit in which a push-pull structure including a series connection of a low-side main switch element and a high-side main switch element is formed between a pair of drive voltage supply lines, the connecting point of the two main switch elements is connected to an output terminal, and a load is connected to the output terminal. In the load driving circuit, an overvoltage prevention switch is provided so as to connect a control electrode and a low-potential-side control subject electrode of the low-side main switch element (main switch element B). And voltage control is provided by a control circuit so as to connect a control terminal of the overvoltage prevention switch to the low-potential-side control subject electrode of the main switch element B and to connect the control terminal of the overvoltage prevention switch to the control electrode of the main switch element B, respectively.

The voltage control circuit turns on the overvoltage prevention switch only in a prescribed period of a period when the potential of the output terminal varies. The term "prescribed period" means a potential rise period of the potential variation period.

The invention also provides a driver IC comprising any of the above load driving circuits as well as a plasma display panel comprising the driver IC.

To attain the above object, still another aspect of the invention provides a load driving circuit in which a low-potential-side control subject electrode of a high-side main switch element is connected to an output terminal and a load is connected to the output terminal. In the load driving circuit, an overvoltage prevention switch is provided so as to connect a control electrode and the low-potential-side control subject electrode of the high-side main switch element. And voltage control is provided by a control circuit so as to connect a control terminal of the overvoltage prevention switch to the low-potential-side control subject electrode of the high-side main switch element and to connect the control terminal of the overvoltage prevention switch to the control electrode of the high-side main switch element, respectively.

The voltage control circuit turns on the overvoltage prevention switch only in a prescribed period of a period when the potential of the output terminal varies. The term "prescribed period" means a potential fall period of the potential variation period.

To attain the above object, a further aspect of the invention provides a load driving circuit in which a high-potential-side control subject electrode of a low-side main switch element is connected to an output terminal and a load is connected to the output terminal. In the load driving circuit, an overvoltage prevention switch is provided so as to connect a control electrode and a low-potential-side control subject electrode of the low-side main switch element. And voltage control is provided by a control circuit so as to connect a control terminal of the overvoltage prevention switch to the low-potential-side control subject electrode of the low-side main switch element and to connect the control terminal of the overvoltage prevention switch to the control electrode of the low-side main switch element, respectively.

The voltage control circuit turns on the overvoltage prevention switch only in a prescribed period of a period when the potential of the output terminal varies. The term "prescribed period" means a potential rise period of the potential variation period.

In each of the above load driving circuits, when the potential of the output terminal varies steeply, the voltage control circuit turns on the overvoltage prevention switch (insulated gate device) so that the gate-source voltage of the main switch element concerned is reduced. This prevents an overcurrent from flowing through the main switch element.

The invention can provide a load driving circuit capable of reducing the device areas of the main switch elements which constitute an output circuit section because it is equipped with the protection circuit section, which prevents the main switch elements from being latched up and destroyed due to a surge or noise.

Furthermore, the invention can provide a plasma display panel free of noise generation and erroneous operation, by providing it with any of the above load-driving circuits.

DESCRIPTION OF THE PREFERRED EMBODIMENTS

Embodiments of the invention will be hereinafter described with reference to the drawings.

Embodiment 1

Figure 1:
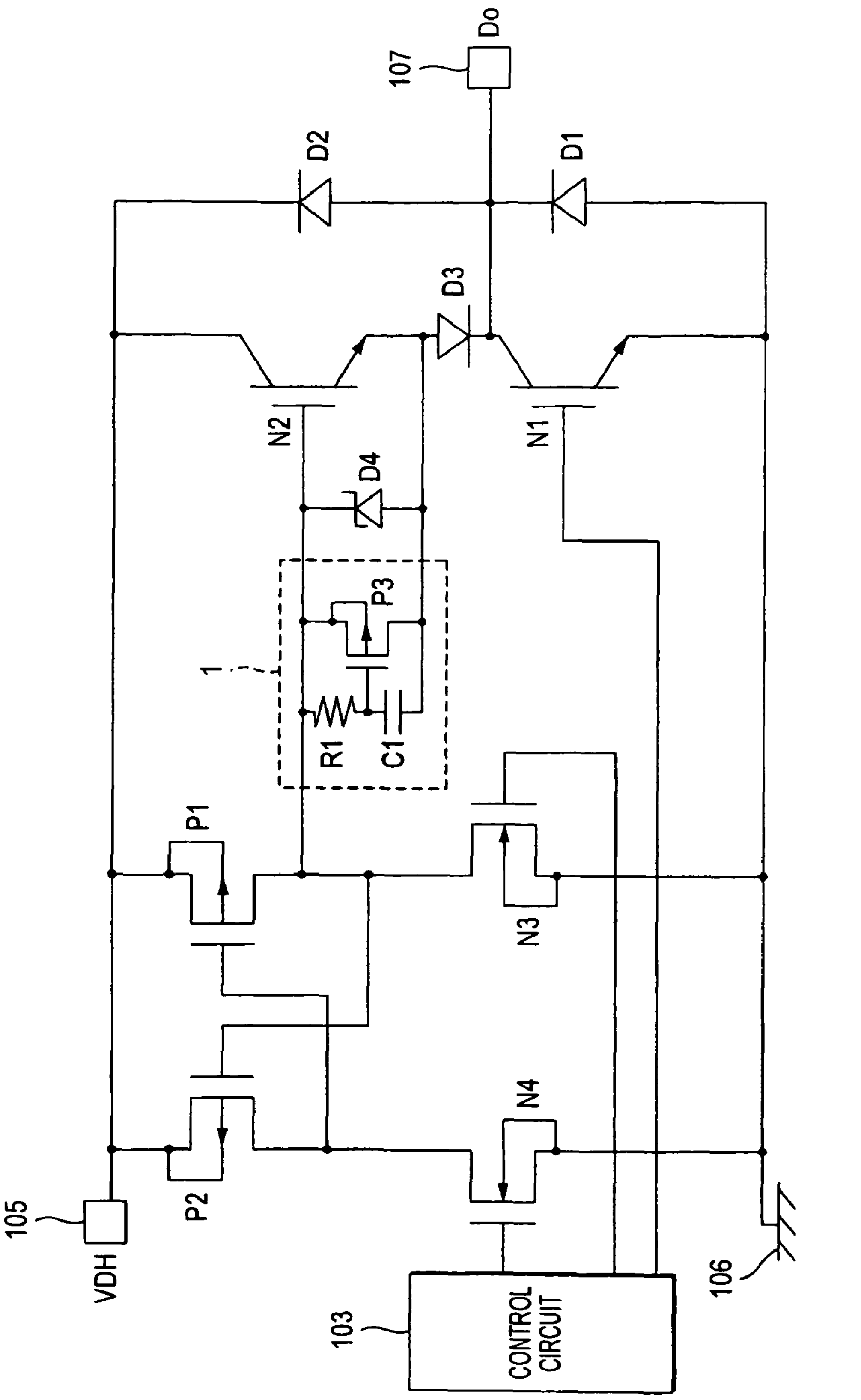
FIG. 1 is a circuit diagram showing a load driving circuit according to a first embodiment.

FIG. 1 is a circuit diagram showing the configuration of a load driving circuit according to a first embodiment. Components having the same components in the conventional circuit of FIG. 11 will be given the same reference symbols as the latter and will not be described in detail.

In addition to the conventional Zener diode D4 for protecting the gate electrode of the transistor N2, the load driving circuit of FIG. 1 is equipped with a p-channel MOSFET P3, a resistor R1, and a capacitor C1, which constitute a protection circuit section 1 for the high-side transistor N2.

The source and the drain of the MOSFET P3 are connected to the gate (control electrode) and the source (low-potential-side control subject electrode) of the transistor N2, respectively. The gate of the MOSFET P3 is connected to the gate of the transistor N2 via the resistor R1 and is connected to the source of the transistor N2 via the capacitor C1.

The protection circuit section 1 is characterized in that the resistor R1 as a voltage control circuit is provided for the MOSFET P3 as an overvoltage prevention switch and that the capacitor C1 is connected between the gate and the drain of the MOSFET P3.

Next, the operation of the protection circuit section 1 having the above configuration will be described.

When the potential of the output terminal 107 falls steeply from the high level to the low level due to an external cause, the source-side potential of the high-side transistor N2 lowers instantaneously and the gate-source voltage of the transistor N2 thereby increases. At this time, a charging current comes to flow through the capacitor C1 from the MOSFET P1 of the level shifter section via the resistor R1. The gate potential of the MOSFET P3 decreases and the MOSFET P3 is turned on, whereby the gate potential of the transistor N2 is lowered. The charging current flows through the capacitor C1 during a fall period of a voltage variation period (see FIG. 12(*a*)), whereby the MOSFET P3 is kept on. When the charging of the capacitor C1 has finished, the MOSFET P3 is turned off and the gate-source voltage of the transistor N2 is clamped at the Zener voltage of the Zener diode D4.

In the first embodiment, the effect of suppressing a jump of the gate voltage becomes stronger as the capacitance of the capacitance C1 increases. However, where the protection circuit section 1 is implemented as an actual semiconductor device, several picofarads is sufficient. The capacitor C1 having too large a capacitance adversely affects the switching speed of the transistor N2. Since the switching speed of the transistor N2 influences the performance of the entire IC, too large a capacitance is also problematic. Whereas capacitance values around 10 pF cause no problem, capacitance values larger than about 10 pF cause adverse effects.

Figure 11:
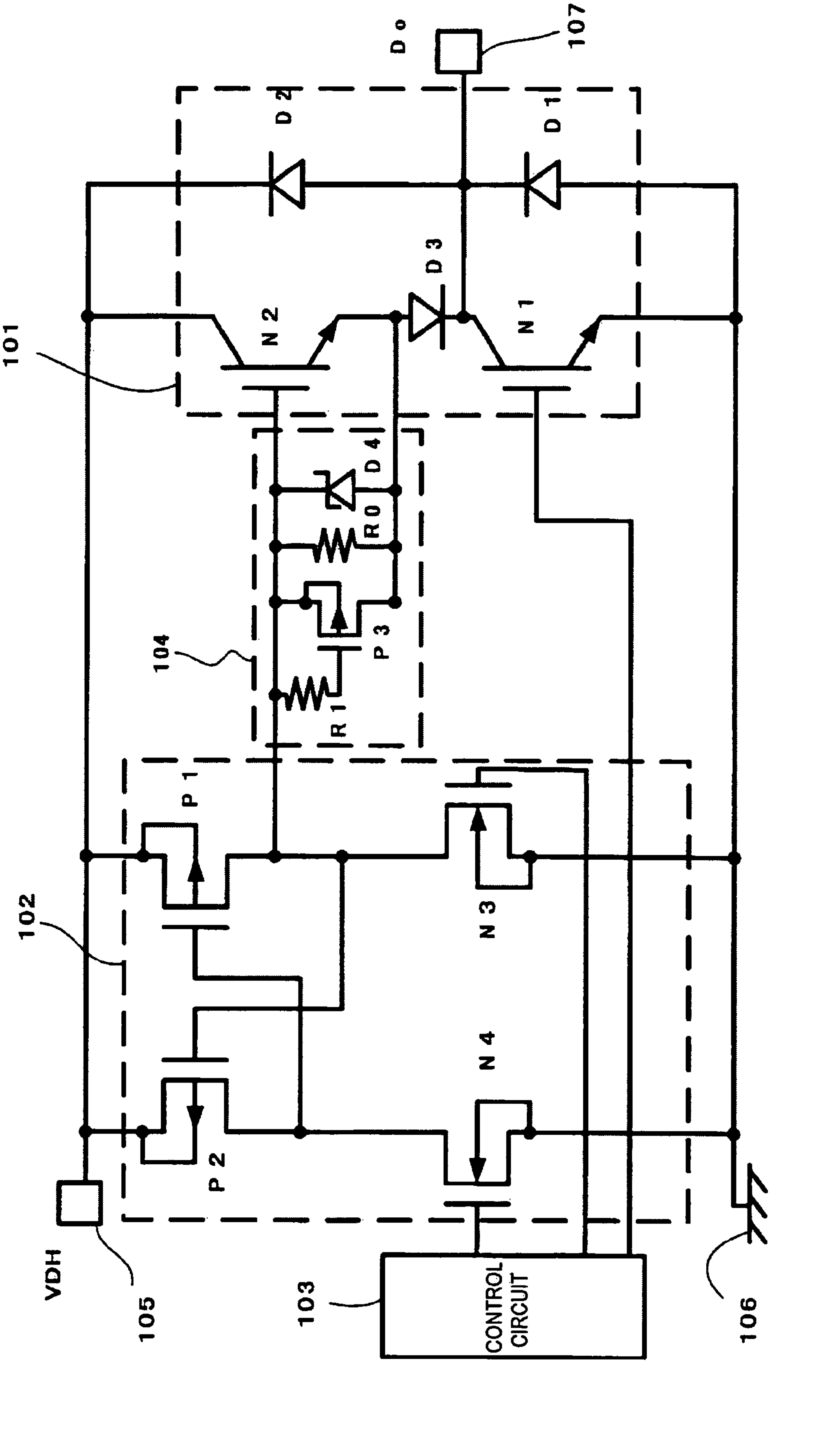
FIG. 11 is a circuit diagram showing a conventional load driving circuit for a PDP.

In the conventional circuit of FIG. 11, the gate-drain parasitic capacitance of the MOSFET P3 is on the order of femtofarads and its influence on the gate voltage suppression is low. For example, even if the capacitance of the capacitor C1 is 1 pF, a suppressible gate-source jump voltage of the transistor N2 is as small as about 0.2 V. In the case of the conventional circuit of FIG. 11, a suppressible jump voltage is even smaller by a factor of about 1/1000. That is, to suppress a jump voltage of 0.2 V, the parasitic capacitance of the MOSFET P3 needs to be made 1,000 times or more larger.

The resistance of the resistor R1 is determined in connection with the capacitance of the capacitor C1 and is set at several thousand ohms to tens of thousands of ohms.

As described above, in contrast to the conventional circuit of FIG. 11 in which only the resistor R1 is connected between the gate and the source of the MOSFET P3, in the embodiment the capacitor C1 is additionally connected between the gate and the drain of the MOSFET P3. Therefore, even if the potential of the output terminal 107 varies and the gate voltage of the transistor N2 jumps to a large extent, not only is the MOSFET P3 turned on instantaneously to lower the gate voltage of the transistor N2 but also the MOSFET P3 can be kept on for a sufficient time to lower the gate voltage to a steady-state voltage level.

In the conventional circuit of FIG. 11, the resistor R0 is provided as a protection resistor for the Zener diode D4. In this embodiment, the resistor R0 is not necessary because the voltage control circuit consisting of the resistor R1 and the capacitor C1 is provided. However, even if the protection resistor R0 is provided, it does not influence the operation of the load driving circuit.

Embodiment 2

Figure 2:
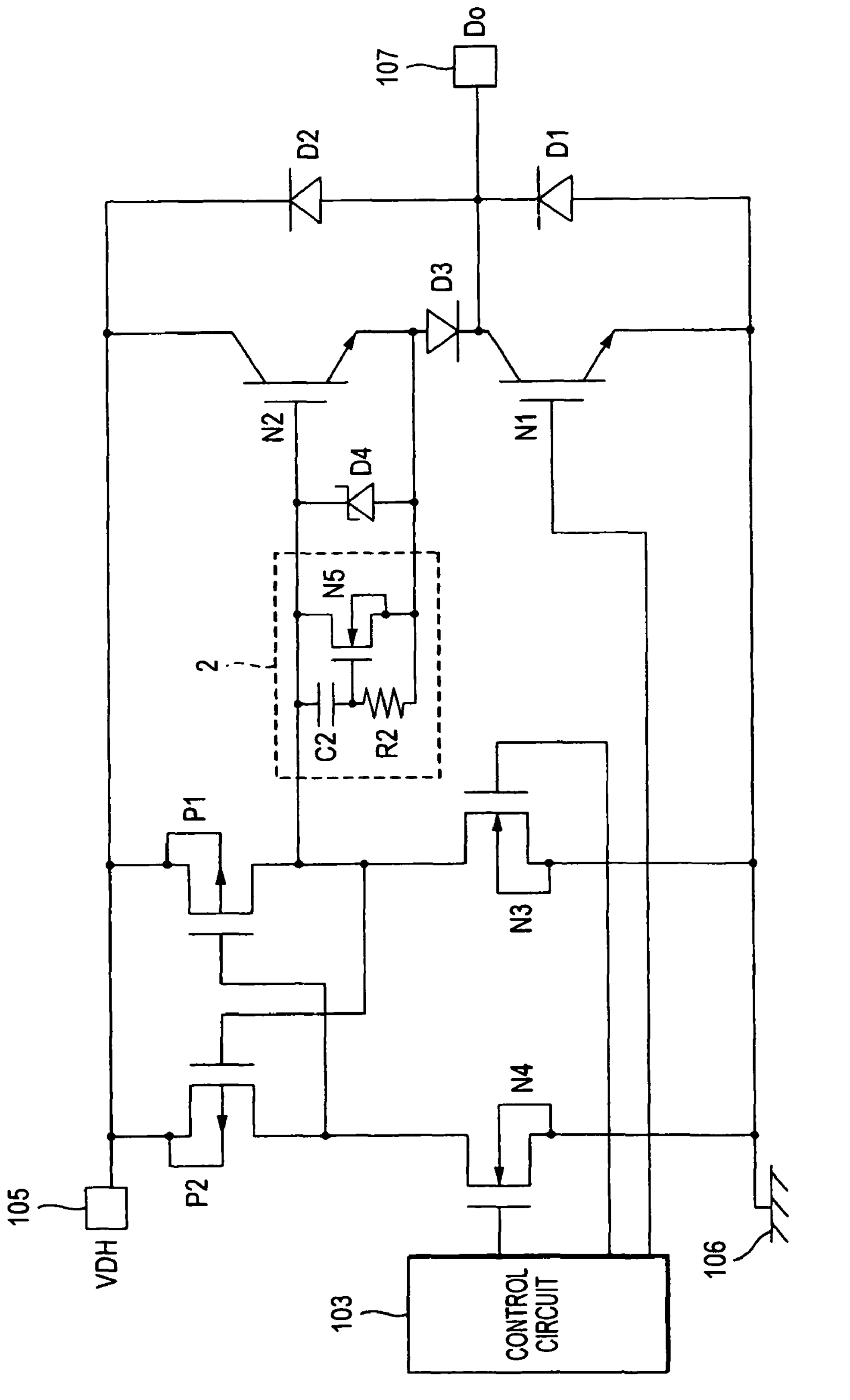
FIG. 2 is a circuit diagram showing a load driving circuit according to a second embodiment.

FIG. 2 is a circuit diagram showing the configuration of a load driving circuit according to a second embodiment. Components having the same components in the conventional circuit of FIG. 11 will be given the same reference symbols as the latter as in the case of the first embodiment, and will not be described in detail.

A protection circuit section 2 of this load driving circuit is different from the protection circuit section 1 according to the first embodiment in that the overvoltage prevention switch inserted between the gate and the source of the transistor N2 is changed from the p-channel MOSFET P3 to an n-channel MOSFET N5. That is, the drain and the source of the n-channel MOSFET N5 are connected to the gate and the source of the transistor N2, respectively. The gate of the MOSFET N5 is connected to the gate of the transistor N2 via a capacitor C2 and is connected to the source of the transistor N2 via a resistor R2.

The protection circuit section 2 is characterized in that the resistor R2 as a voltage control circuit is provided for the MOSFET N5 as an overvoltage prevention switch and that the capacitor C2 is connected between the gate and the drain of the MOSFET N5.

Next, the operation of the protection circuit section 2 having the above configuration will be described.

When the potential of the output terminal 107 falls steeply from the high level to the ground potential (GND) due to an external cause, the source-side potential of the high-side transistor N2 lowers instantaneously and the gate-source voltage of the transistor N2 thereby increases. At this time, a charging current comes to flow into the capacitor C2 from the MOSFET P1 of the level shifter section. The gate potential of the MOSFET N5 increases and the MOSFET N5 is turned on, whereby the gate potential of the transistor N2 is lowered. The charging current flows through the capacitor C2 during a fall period of a voltage variation period (see FIG. 12(*a*)), whereby the MOSFET N5 is kept on.

Then, the gate voltage of the MOSFET N5 decreases as the capacitor C2 is charged. When the charging of the capacitor C2 has finished, the MOSFET N5 is turned off and the gate-source voltage of the transistor N2 is clamped at the Zener voltage of the Zener diode D4.

The protection circuit section 2 according to the second embodiment operates in the same manner as the protection circuit section 1 according to the first embodiment though they are different from each other in circuit configuration. The capacitance of the capacitor C2 and the resistance of the resistor R2 can be set at the corresponding values in the first embodiment.

Embodiment 3

Figure 3:
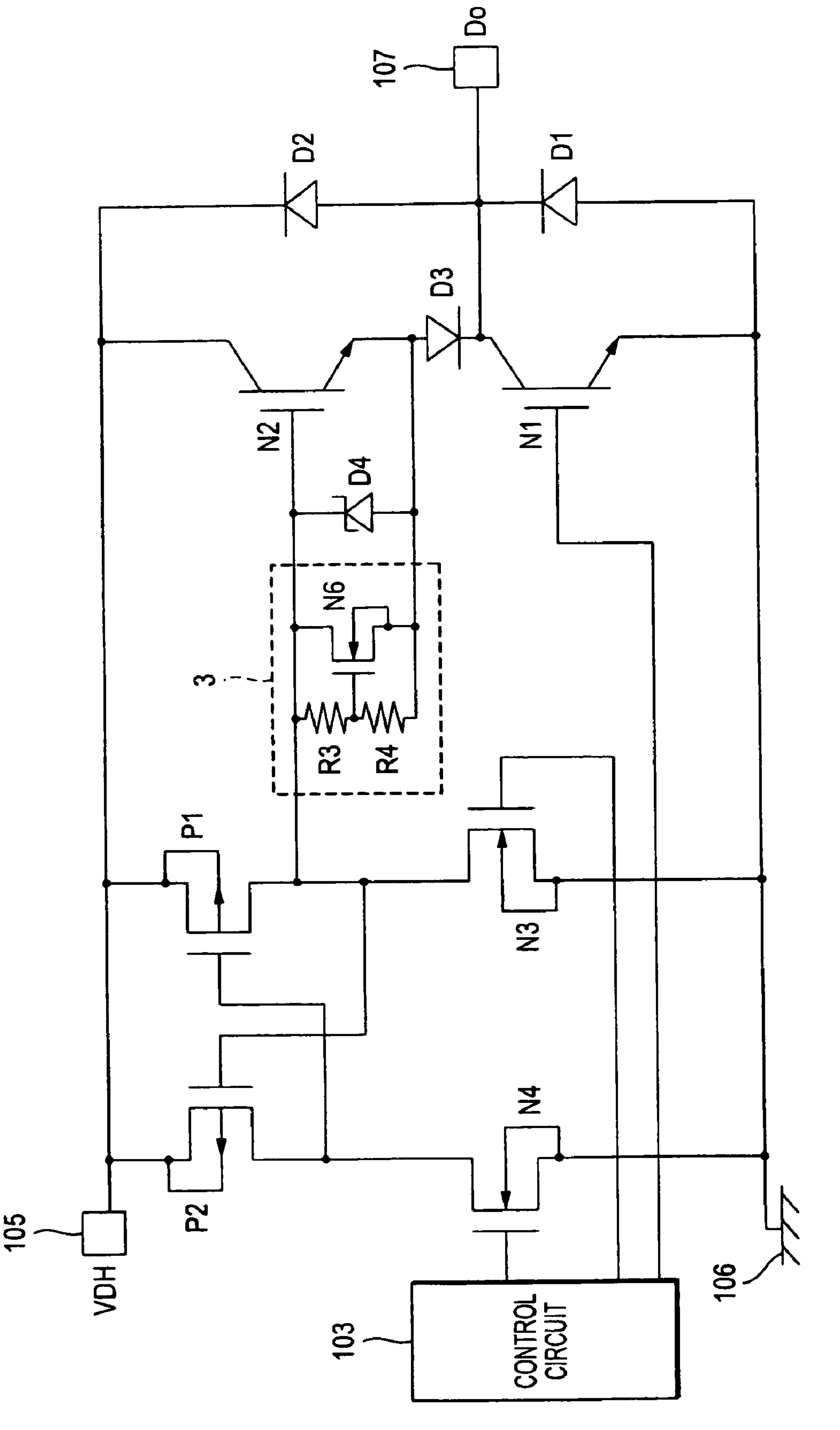
FIG. 3 is a circuit diagram showing a load driving circuit according to a third embodiment.

FIG. 3 is a circuit diagram showing the configuration of a load driving circuit according to a third embodiment. In addition to the conventional Zener diode D4 for protecting the gate electrode of the transistor N2, the load driving circuit of FIG. 3 is equipped with an n-channel MOSFET N6 and resistors R3 and R4, which constitute a protection circuit section 3 for the high-side transistor N2.

The protection circuit section 3 is characterized in that a series circuit of the resistors R3 and R4 as a voltage control circuit is provided for the MOSFET N6 as an overvoltage prevention switch and that the gate electrode of the MOSFET N6 is connected to the gate and the source of the transistor N2 via the resistors R3 and R4, respectively, so that the gate voltage of the MOSFET N6 is determined by the voltage division of the resistors R3 and R4.

Next, the operation of the protection circuit section 3 having the above configuration will be described.

When the potential of the output terminal 107 falls steeply from the high level to the ground level (GND) due to an external cause, the source-side potential of the high-side transistor N2 lowers instantaneously and the gate-source voltage of the transistor N2 thereby increases. When the gate-source voltage of the transistor N2 is increased, the gate voltage of the MOSFET N6 increases according to the voltage division ratio of the resistors R3 and R4. When the gate-source voltage of the transistor N2 has exceeded a threshold voltage, the MOSFET N6 is turned on, whereby the gate-source voltage of the transistor N2 is lowered.

The gate-source voltage of the transistor N2 at which the MOSFET N6 is turned on is set so as to be lower than the Zener voltage of the Zener diode D4.

Figure 12A:
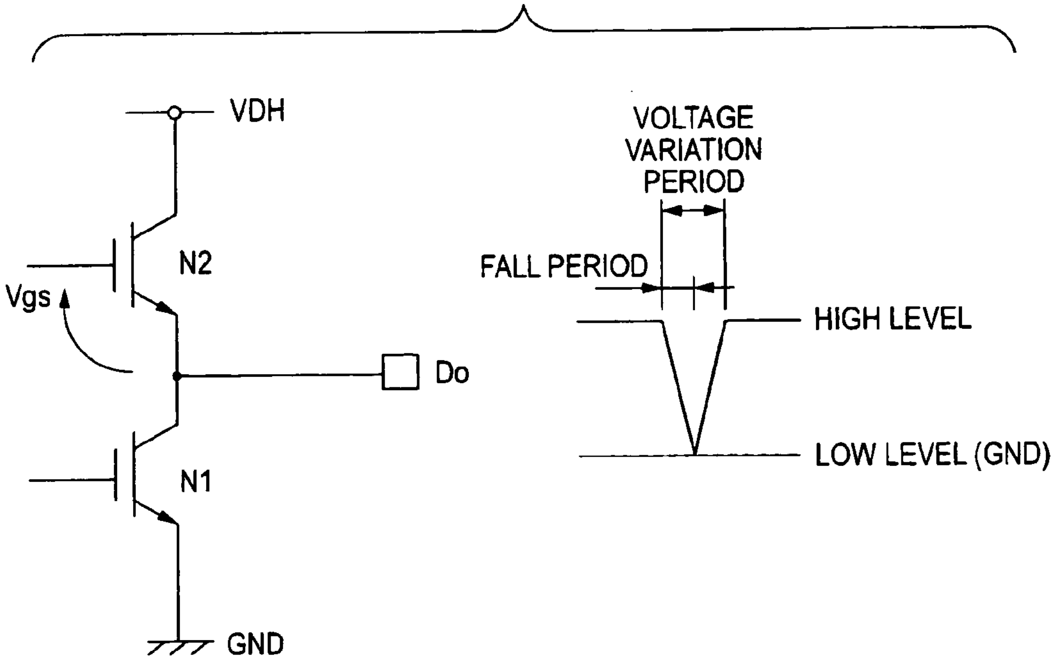
FIGS. 12(*a*) and 12(*b*) illustrate a voltage variation period.
Figure 12B:
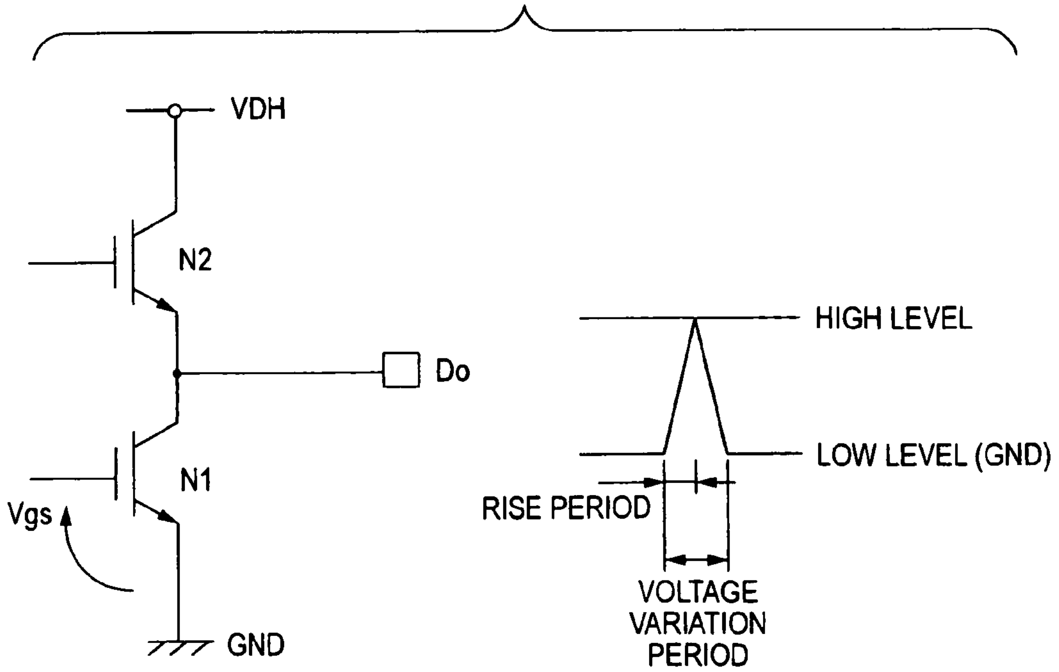

The MOSFET N6 is turned on in a fall period of a voltage variation period shown in FIG. 12(*a*). After a lapse of the fall period, the gate voltage of the MOSFET N6 becomes lower than the threshold voltage of the MOSFET N6 and the MOSFET N6 is again turned off. The gate-source voltage of the transistor N2 is clamped at the Zener voltage of the Zener diode D4.

Next, a method for determining the voltage division ratio of the resistors R3 and R4 will be described.

The voltage division ratio of the resistors R3 and R4 is determined so that the MOSFET N6 is turned on even if the variation width of the gate-source voltage of the transistor N2 is lower than the clamping voltage of the Zener diode D4. For example, if the clamping voltage of the Zener diode D4 (a gate-source voltage of the transistor N2) is equal to 5 V, the voltage division ratio is determined so that the MOSFET N6 is turned on when the gate-source voltage of the transistor N2 becomes 4.5 V. Although this voltage value being smaller than 4.5 V is preferable in terms of protection of the transistor N2 from overcurrent breaking, it lowers the switching speed of the transistor N2. Therefore, the voltage value being smaller than 4.5 V is not suitable for a PDP load driving circuit that is required to exhibit a certain level of turn-on speed. In summary, the resistance values of the resistors R3 and R4 are determined so as to prevent an overcurrent from flowing from the MOSFET P1 of the level shifter section and not to influence the speed of an ordinary on/off operation.

The resistance values of the resistors R3 and R4 need not be set at particular values because the gate voltage of the MOSFET N6 is determined according to their ratio. However, in view of the magnitudes of currents flowing through the resistors R3 and R4 in a steady state, it is preferable that they be set at several thousand of ohms or more.

As described above, in the load driving circuit according to the third embodiment, the protection circuit section 3 is composed of the n-channel MOSFET N6 and the resistors R3 and R4. And the MOSFET N6 is kept on only while the gate-source voltage of the transistor N2, which is the high-side main switch element, is higher than the voltage that is set for the MOSFET N6. Therefore, an overcurrent that would otherwise flow through the transistor N2 due to a surge or the like can be prevented and the output circuit section can be protected reliably.

Although in the load driving circuit of FIG. 3 the overvoltage prevention switch of the protection circuit section 3 is the n-channel MOSFET N6, it may be replaced by a p-channel MOSFET.

Embodiments 4 and 5

Figure 4:
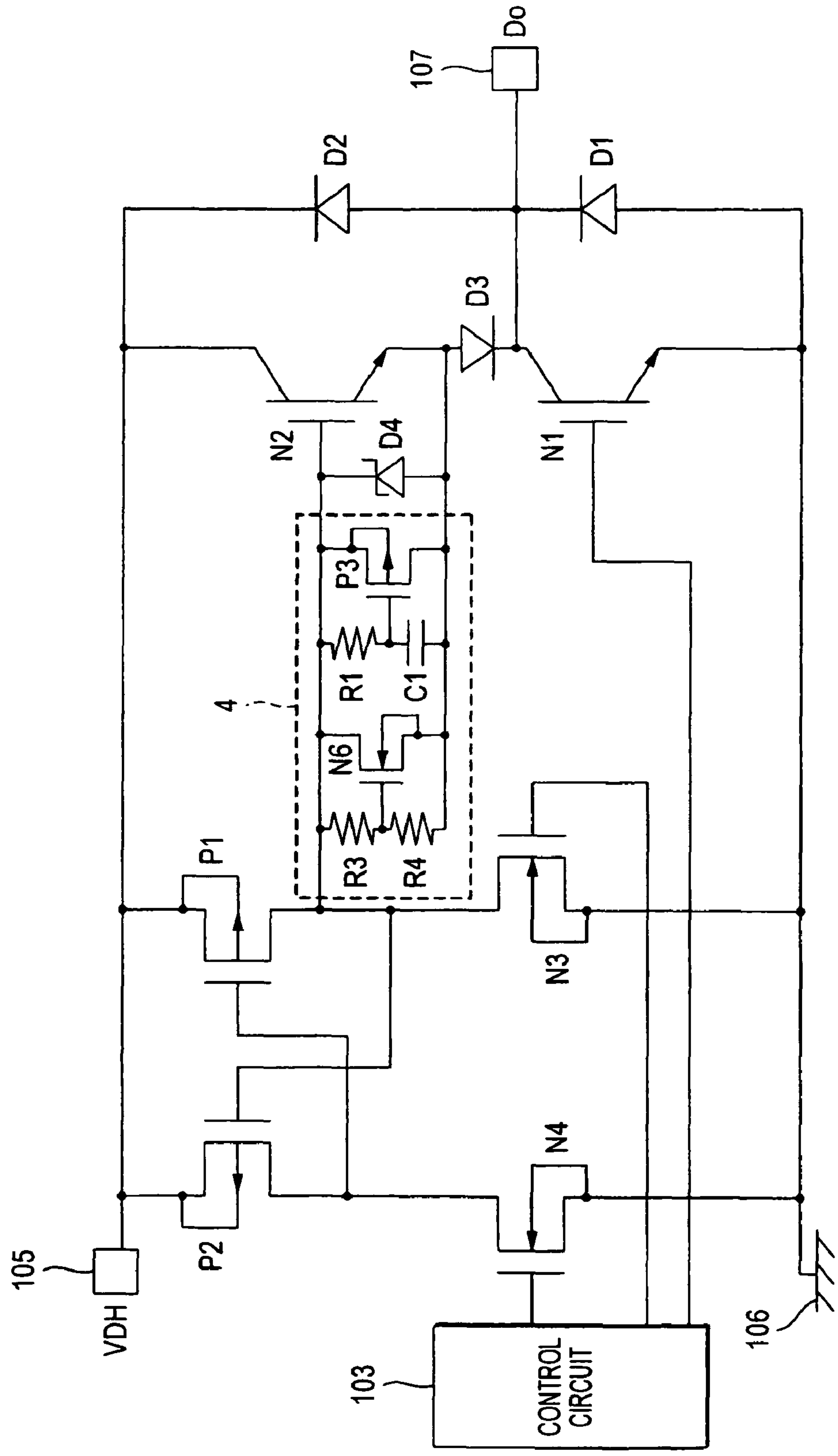
FIG. 4 is a circuit diagram showing a load driving circuit according to a fourth embodiment.
Figure 5:
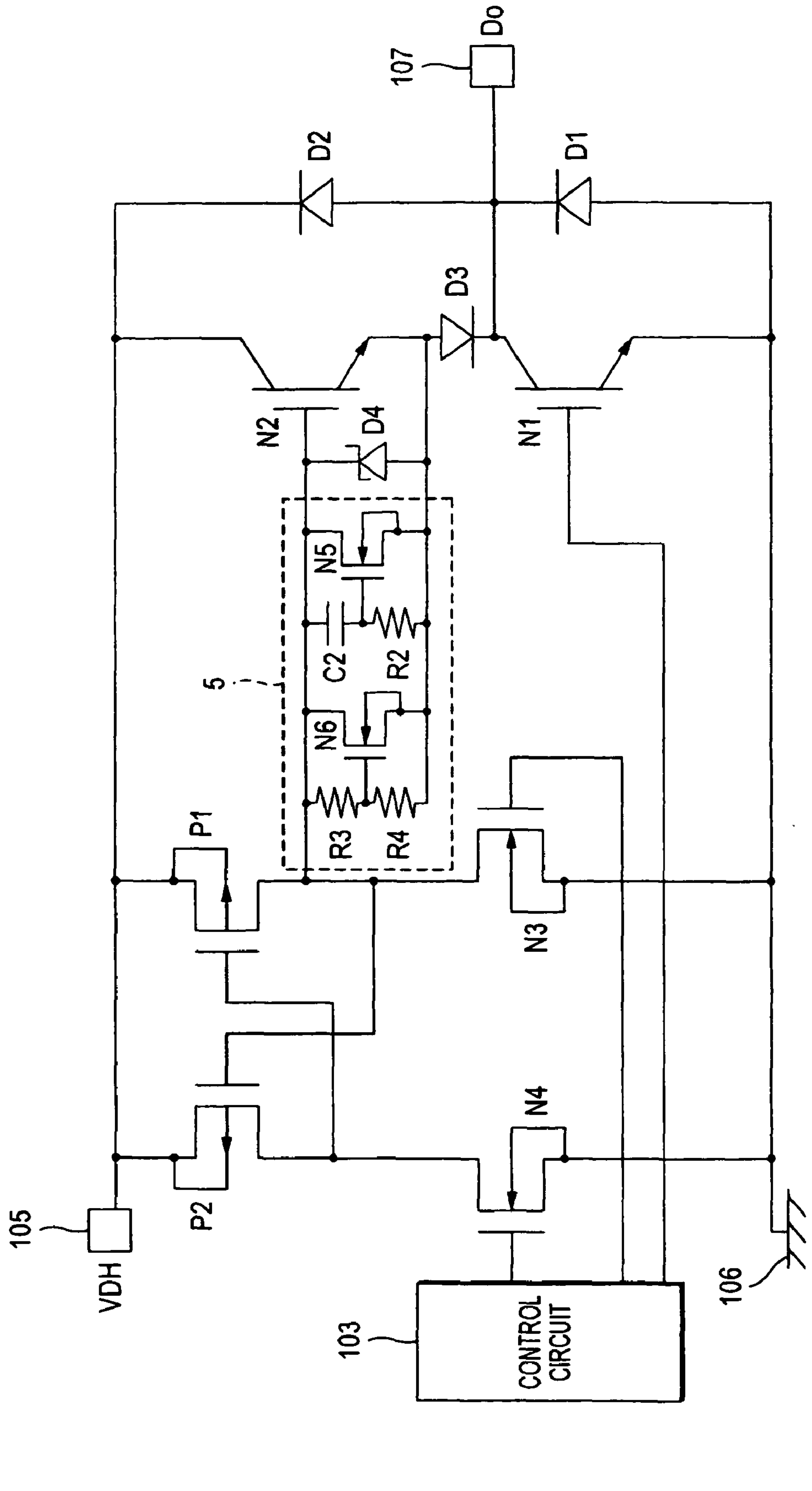
FIG. 5 is a circuit diagram showing a load driving circuit according to a fifth embodiment.

FIGS. 4 and 5 are circuit diagrams showing the configurations of load driving circuits according to fourth and fifth embodiments, respectively.

In addition to the conventional Zener diode D4 for protecting the gate electrode of the transistor N2, the load driving circuit of FIG. 4 is equipped with a p-channel MOSFET P3, a resistor R1, a capacitor C1, an n-channel MOSFET N6, and resistors R3 and R4, which constitute a protection circuit section 4 for the high-side transistor N2. That is, the protection circuit section 1 according to the first embodiment is connected in parallel to the protection circuit section 3 provided in the load driving circuit according to the third embodiment.

In addition to the conventional Zener diode D4 for protecting the gate electrode of the transistor N2, the load driving circuit of FIG. 5 is equipped with an n-channel MOSFET N5, a resistor R2, a capacitor C2, an n-channel MOSFET N6, and resistors R3 and R4, which constitute a protection circuit section 5 for the high-side transistor N2. That is, the protection circuit section 2 according to the second embodiment is connected in parallel to the protection circuit section 3 provided in the load driving circuit according to the third embodiment.

Therefore, components in FIGS. 4 and 5 having corresponding components in the first to third embodiments are given the same reference symbols as the latter.

The third embodiment is largely different from the first and second embodiments in the following point. In the first and second embodiments, the overvoltage prevention switch (MOSFET P3 or N5) is turned on only when the gate-source voltage of the transistor N2 has jumped due to a surge. In contrast, in the third embodiment, the overvoltage prevention switch (MOSFET N6) of the protection circuit section 3 is kept on while the gate-source voltage of the transistor N2 is higher than the preset voltage. As such, whereas the protection circuit sections 1 and 2 according to the first and second embodiments have the effect of preventing an instantaneous overshoot of the gate-source voltage of the transistor N2, the protection circuit section 3 according to the third embodiment has the effect of limiting the voltage level of the gate-source voltage of the transistor N2.

In view of the above difference between the effect of the protection circuit sections 1 and 2 and that of the protection circuit section 3, the protection circuit sections 4 and 5 of the load driving circuits according to the fourth and fifth embodiments are constructed by combining the protection circuit section 3 with the protection circuit section 1 or 2. In the fourth and fifth embodiments, the protection circuit sections 4 and 5 occupy larger areas. However, since the areas of the protection circuit sections 4 and 5 are small relative to the areas of the transistors N1 and N2 that are parts of the output circuit section, the size of the entire semiconductor device can be reduced. Furthermore, it becomes possible to prevent, more reliably, an erroneous operation and breakage of the device due to an overcurrent.

Incidentally, contrary to the case of the high-side transistor N2, when the potential of the output terminal 107 has increased rapidly, there may occur an event that an overcurrent flows, from the load which is connected to the output terminal 107, into the transistor N1, which is the low-side main switch element of the totem pole structure provided between the pair of drive voltage supply lines and the transistor N1, is destroyed due to overcurrent heating. In the embodiments described below, an overcurrent is prevented from flowing through the transistor N1, which is the low-side main switching element by providing, for the transistor N1, the same protection circuits as in the first to fifth embodiments.

Embodiment 6

Figure 6:
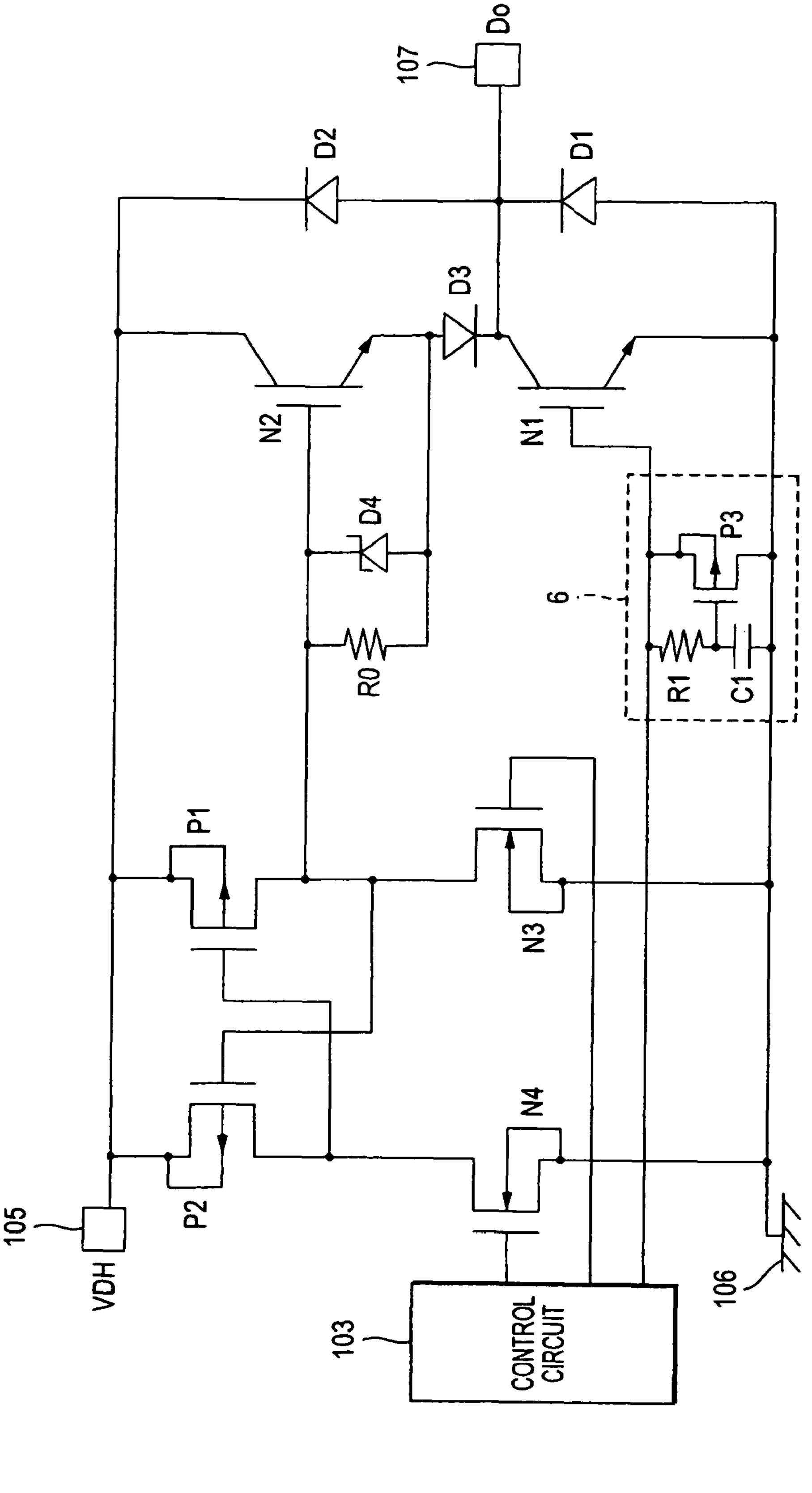
FIG. 6 is a circuit diagram showing a load driving circuit according to a sixth embodiment.
Figure 7:
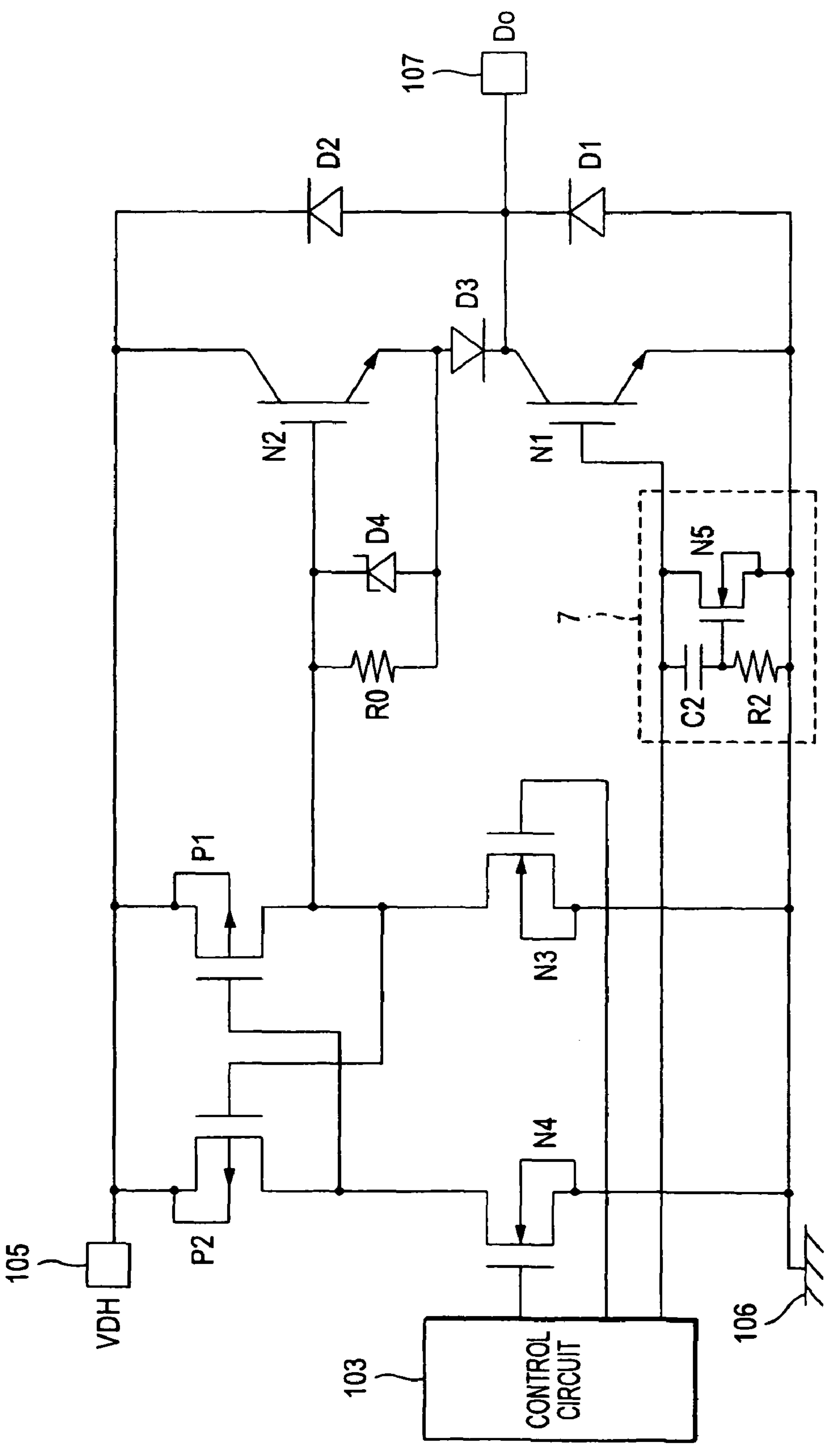
FIG. 7 is a circuit diagram showing a load driving circuit according to a seventh embodiment.
Figure 8:
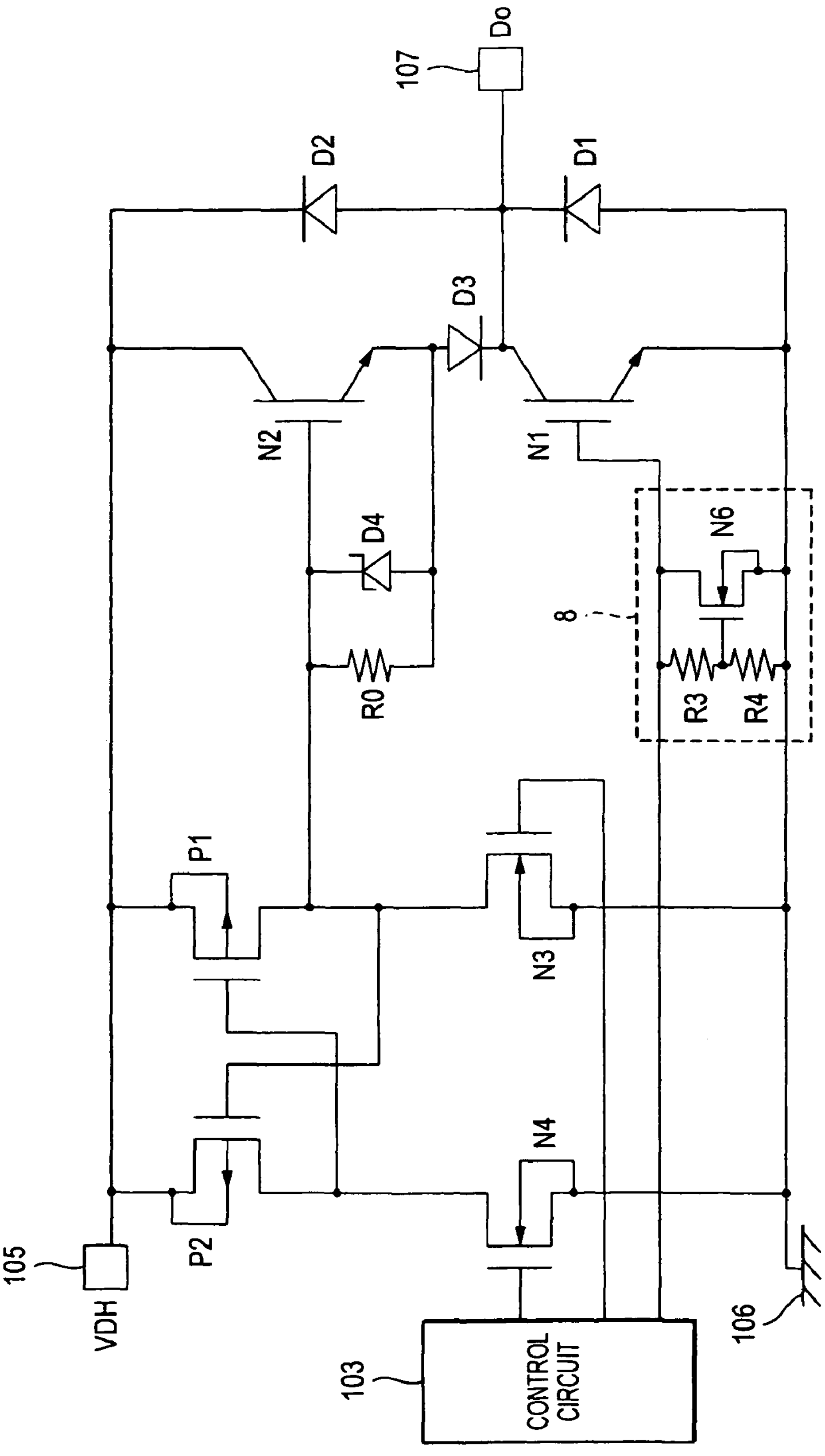
FIG. 8 is a circuit diagram showing a load driving circuit according to an eighth embodiment.
Figure 9:
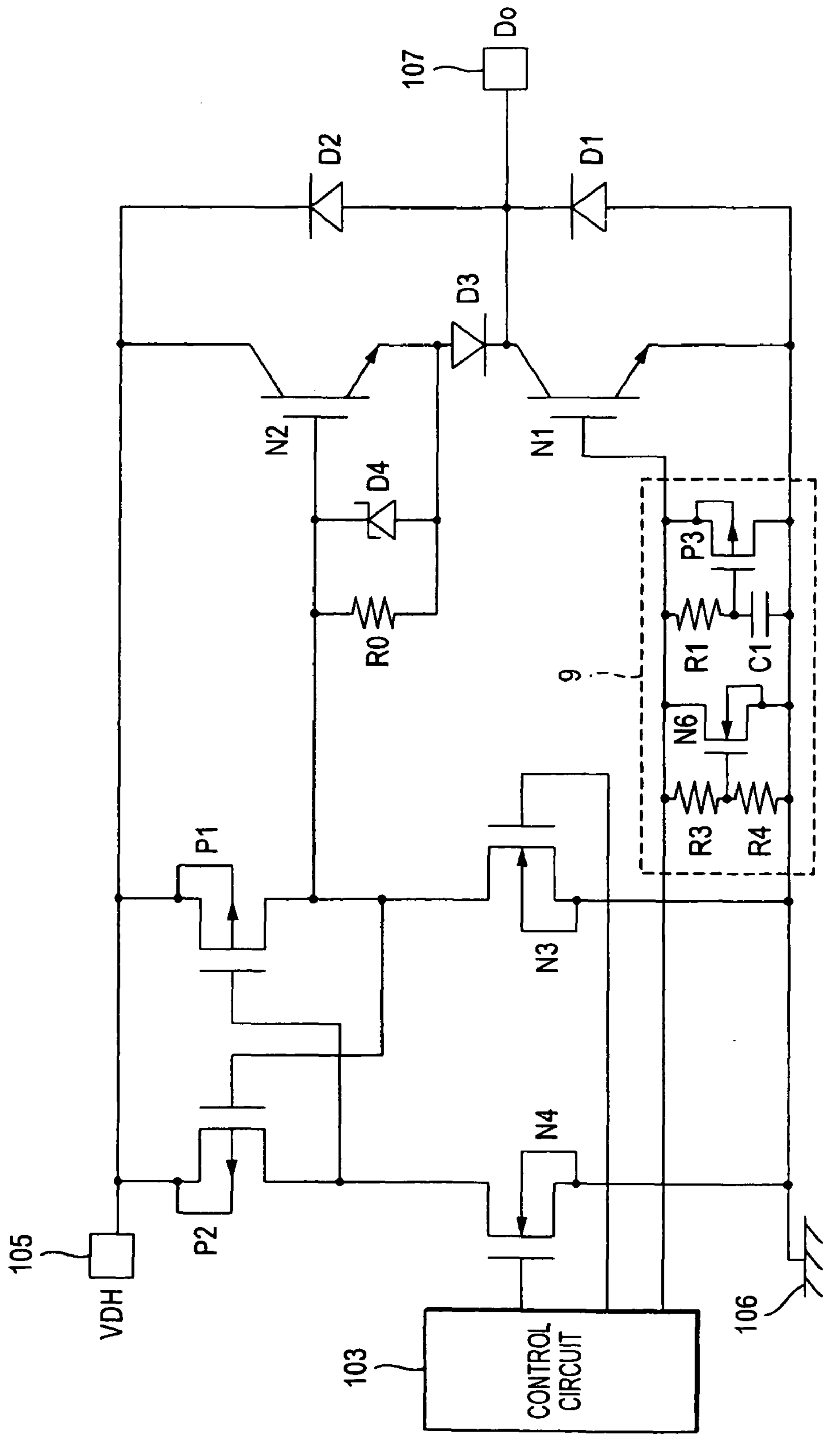
FIG. 9 is a circuit diagram showing a load driving circuit according to a ninth embodiment.
Figure 10:
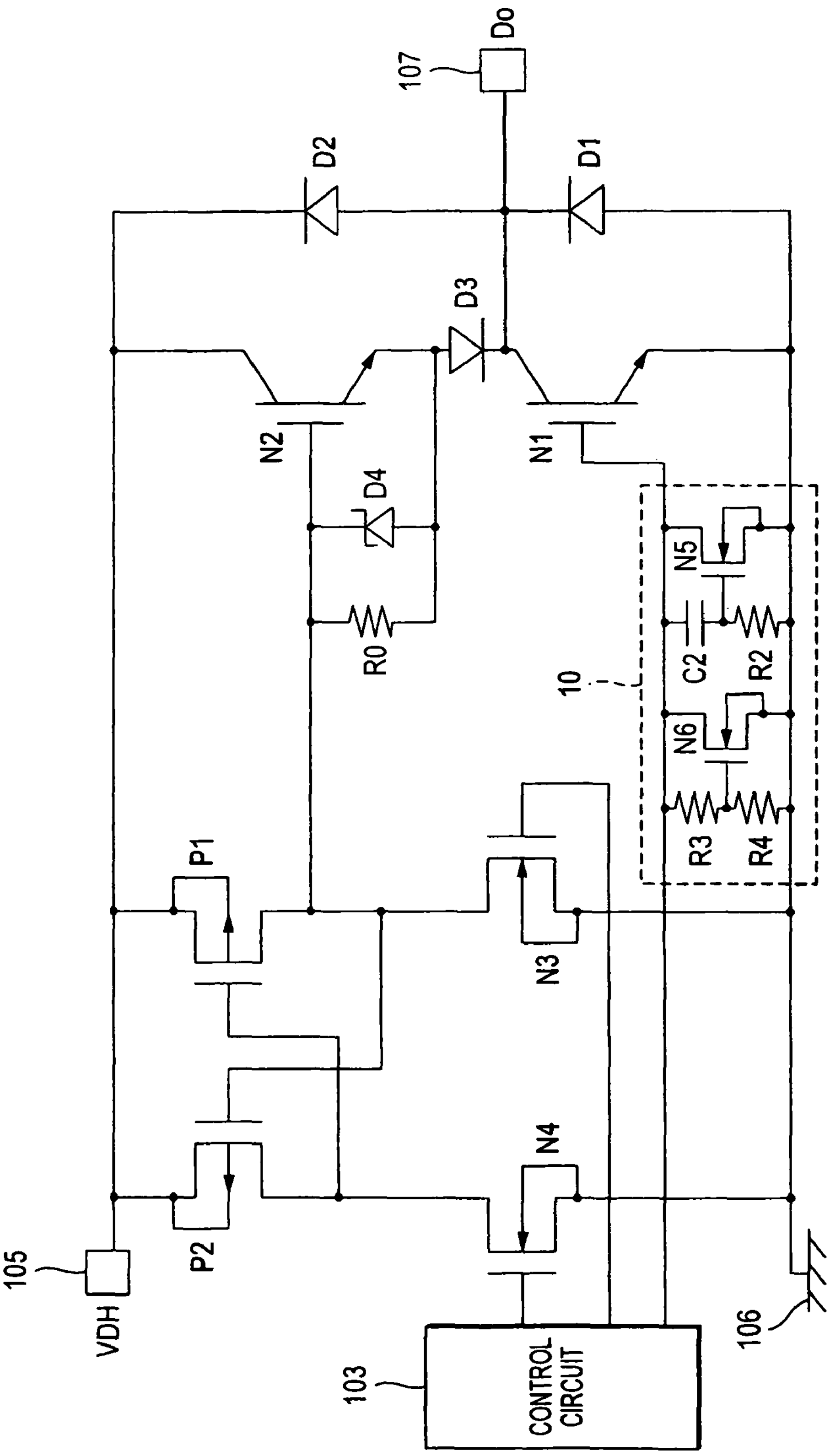
FIG. 10 is a circuit diagram showing a load driving circuit according to a 10th embodiment.

FIG. 6 is a circuit diagram showing the configuration of a load driving circuit according to a sixth embodiment. Components having the same components in the conventional circuit of FIG. 11 will be given the same reference symbols as the latter and will not be described in detail.

In the sixth embodiment, a p-channel MOSFET P3, a resistor R1, and a capacitor C1 which constitute a protection circuit section 6 for the low-side transistor N1 are connected between the gate of the transistor N1 and the ground terminal 106 to which a second drive voltage (GND) is supplied. And a Zener diode D4 for protecting the gate electrode of the transistor N2 and a resistor R0 for reducing the gate voltage are provided.

The source and the drain of the MOSFET P3 are connected to the gate and the source of the transistor N1, respectively. The gate of the MOSFET P3 is connected to the gate of the transistor N1 via the resistor R1 and is connected to the source of the transistor N1 via the capacitor C1.

The protection circuit section 6 is characterized in that the resistor R1 as a voltage control circuit is provided for the MOSFET P3 as an overvoltage prevention switch and that the capacitor C1 is connected between the gate and the drain of the MOSFET P3.

In the circuit of FIG. 11, when the potential of the output terminal 107 increases steeply from the ground potential (GND) to the high level due to an external cause (see FIG. 12(*b*)), the gate-source voltage of the transistor N1 increases and the current flowing between the drain and the source of the transistor N1 also increases. If the increased current exceeds the ability of the transistor N1, the transistor N1 is destroyed.

Next, the operation of the protection circuit section 6 of FIG. 6 will be described.

When the potential of the output terminal 107 rises steeply from the low level to the high level due to an external cause, the drain-side potential of the low-side transistor N1 increases instantaneously and the drain-source voltage of the transistor N1 thereby increases. At this time, a charging current (drain current) comes to flow into the capacitor C1 from the transistor N1 via the resistor R1. The gate potential of the MOSFET P3 decreases and the MOSFET P3 is turned on, whereby the gate potential of the transistor N1 is lowered. Then, the charging current flows through the capacitor C1 during a rise period of a voltage variation period (see FIG. 12(*b*)), whereby the MOSFET P3 is kept on. When the charging of the capacitor C1 has finished, the MOSFET P3 is turned off and the drain-source voltage of the transistor N1 returns to a normal voltage.

In the sixth embodiment, the capacitance of the capacitor C1 and the resistance of the resistor R1 can be set at the same values as in the first embodiment.

As described above, in contrast to the conventional circuit of FIG. 11 in which only the resistor R1 is connected between the gate and the source of the MOSFET P3, in the sixth embodiment the capacitor C1 is additionally connected between the gate and the drain of the MOSFET P3. Therefore, even if the potential of the output terminal 107 jumps to a large extent, not only is the MOSFET P3 turned on instantaneously to lower the gate voltage of the transistor N1 but also the MOSFET P3 can be kept on for a sufficient time to lower the gate voltage to a steady-state voltage level.

Embodiments 7-10

FIGS. 7-10 are circuit diagrams showing the configurations of load driving circuits according to seventh to 10th embodiments, respectively.

In these load driving circuits, the same protection circuit sections as in the above-described second to fifth embodiments are provided for the transistor N1 which is the low-side main switch element, whereby an overcurrent is prevented from flowing through the transistor N1. In FIGS. 7-10, components having the same components in the second to fifth embodiments are given the same reference symbols as the latter. Detailed descriptions of the load driving circuits according to the seventh to 10th embodiments are omitted.

Embodiment 11-13

Figure 13:
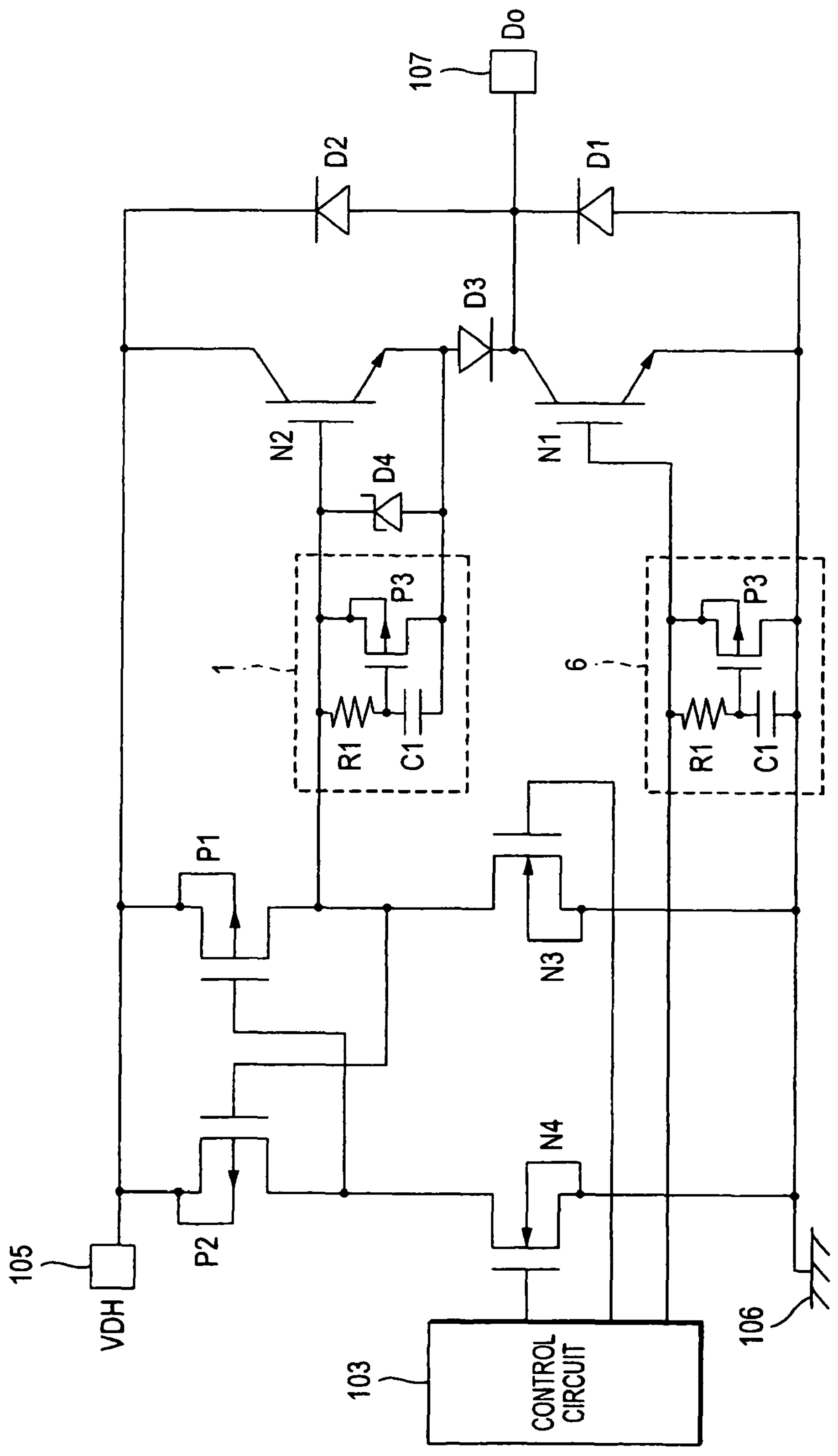
FIG. 13 is a circuit diagram showing a load driving circuit according to a 10th embodiment.
Figure 14:
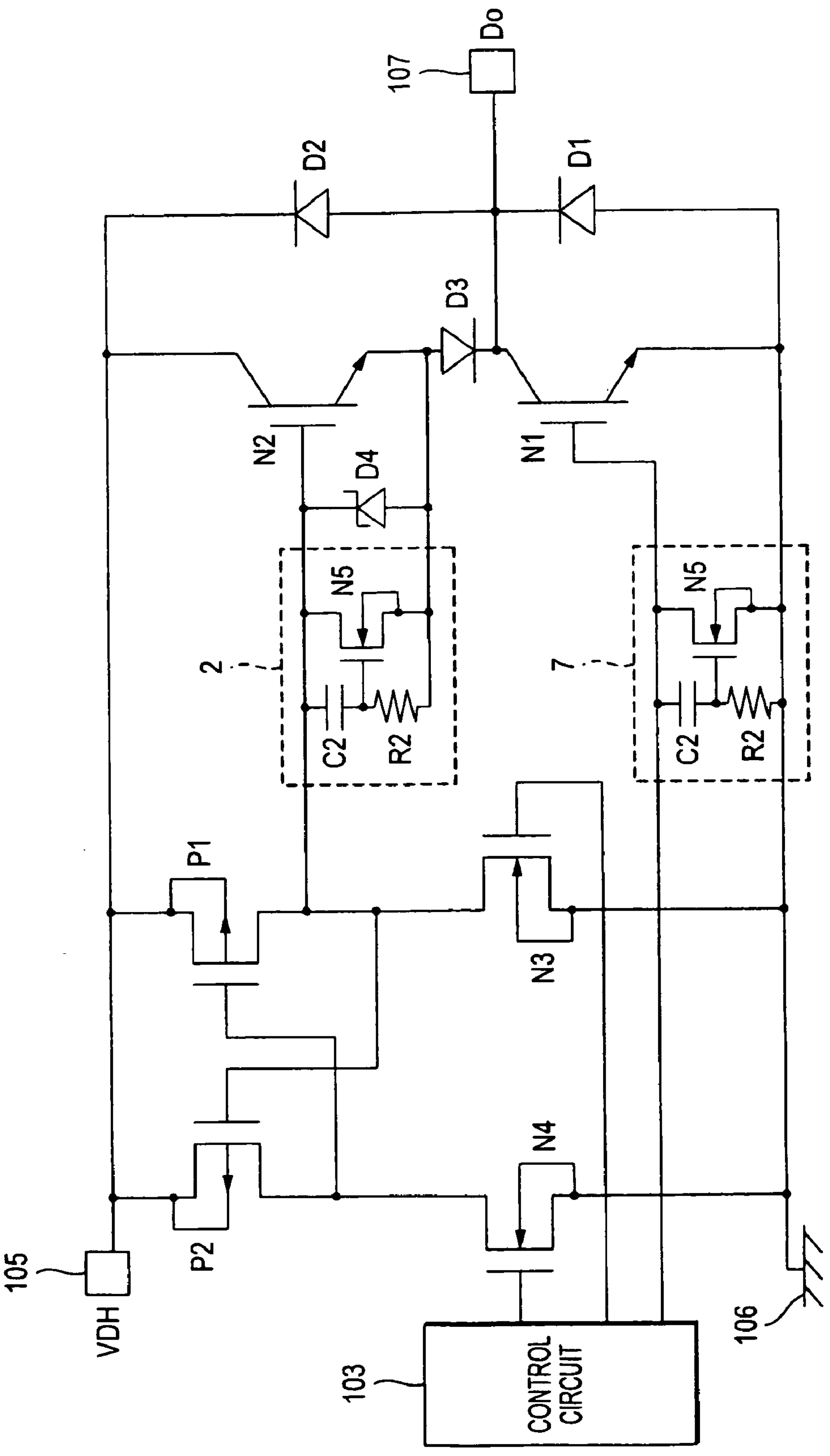
FIG. 14 is a circuit diagram showing a load driving circuit according to an 11th embodiment.
Figure 15:
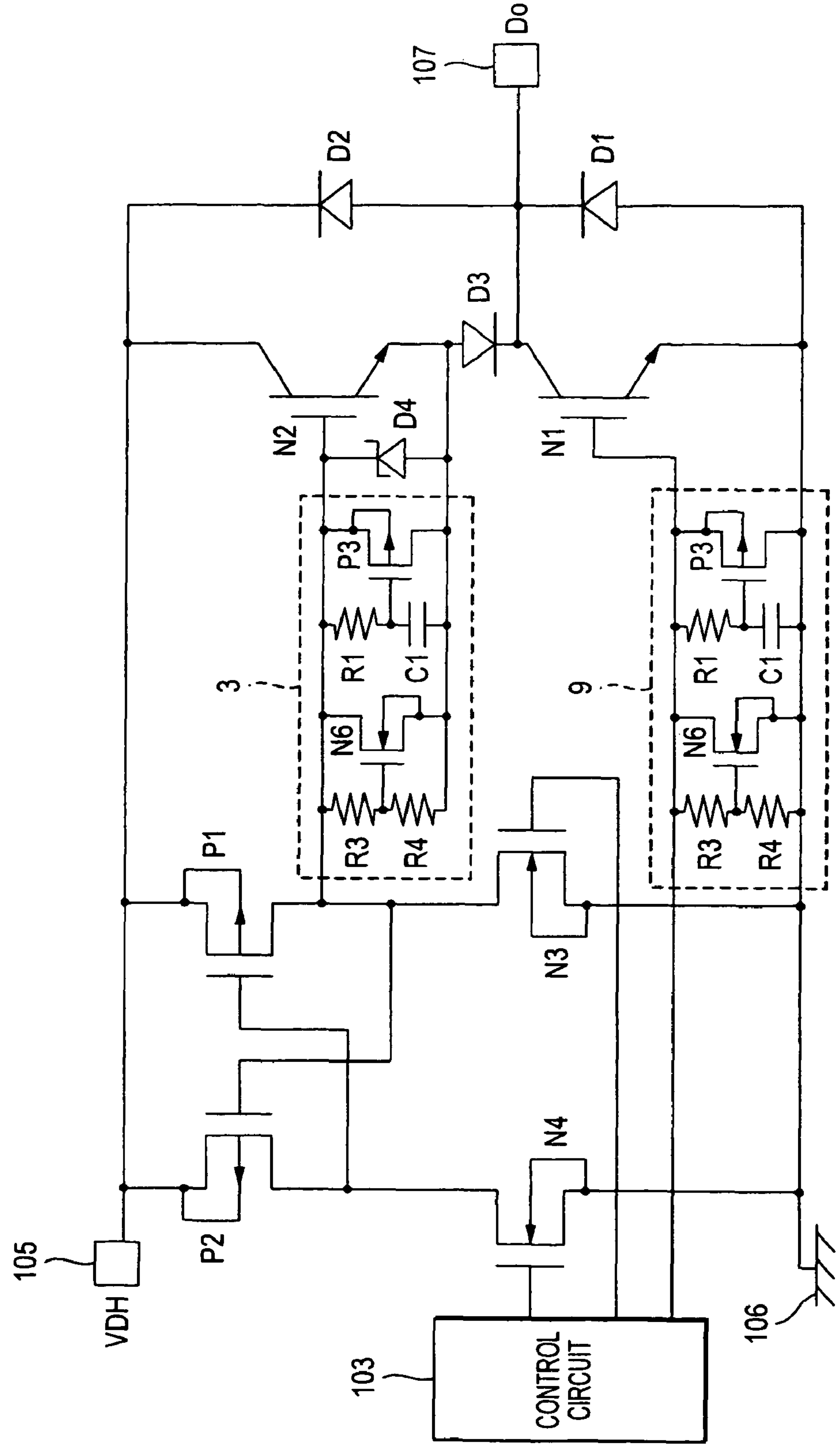
FIG. 15 is a circuit diagram showing a load driving circuit according to a 12th embodiment.

FIGS. 13-15 are circuit diagrams showing the configurations of load driving circuits according to 11th to 13th embodiments, respectively.

The load driving circuit of FIG. 13 is equipped with the above-described protection circuit sections 1 and 6 according to the first and sixth embodiments, respectively, so that an overcurrent flows through neither the transistor N2 (high-side main switch element) nor the transistor N1 (low-side main switch element). Components having the same components in the first and sixth embodiments are given the same reference symbols as the latter and will not be described in detail.

The load driving circuit of FIG. 14 is equipped with the above-described protection circuit sections 2 and 7 according to the second and seventh embodiments, respectively, so that an overcurrent flows through neither the transistor N2 (high-side main switch element) nor the transistor N1 (low-side main switch element). Components having the same components in the second and seventh embodiments are given the same reference symbols as the latter and will not be described in detail.

The load driving circuit of FIG. 15 is equipped with the above-described protection circuit sections 3 and 9 according to the third and ninth embodiments, respectively, so that an overcurrent flows through neither the transistor N2 (high-side main switch element) nor the transistor N1 (low-side main switch element). Components having the same components in the third and ninth embodiments are given the same reference symbols as the latter and will not be described in detail. The transistor N6 may be replaced by a p-channel MOSFET.

Combinations of one of the protection circuit sections 1-5 according to the first to fifth embodiments and one of the protection circuit sections 6-10 according to the sixth to 10th embodiments, other then the above-described combinations according to the 11th to 13th embodiments, may be provided for the transistors N2 and N1.

Embodiment 14

Figure 16:
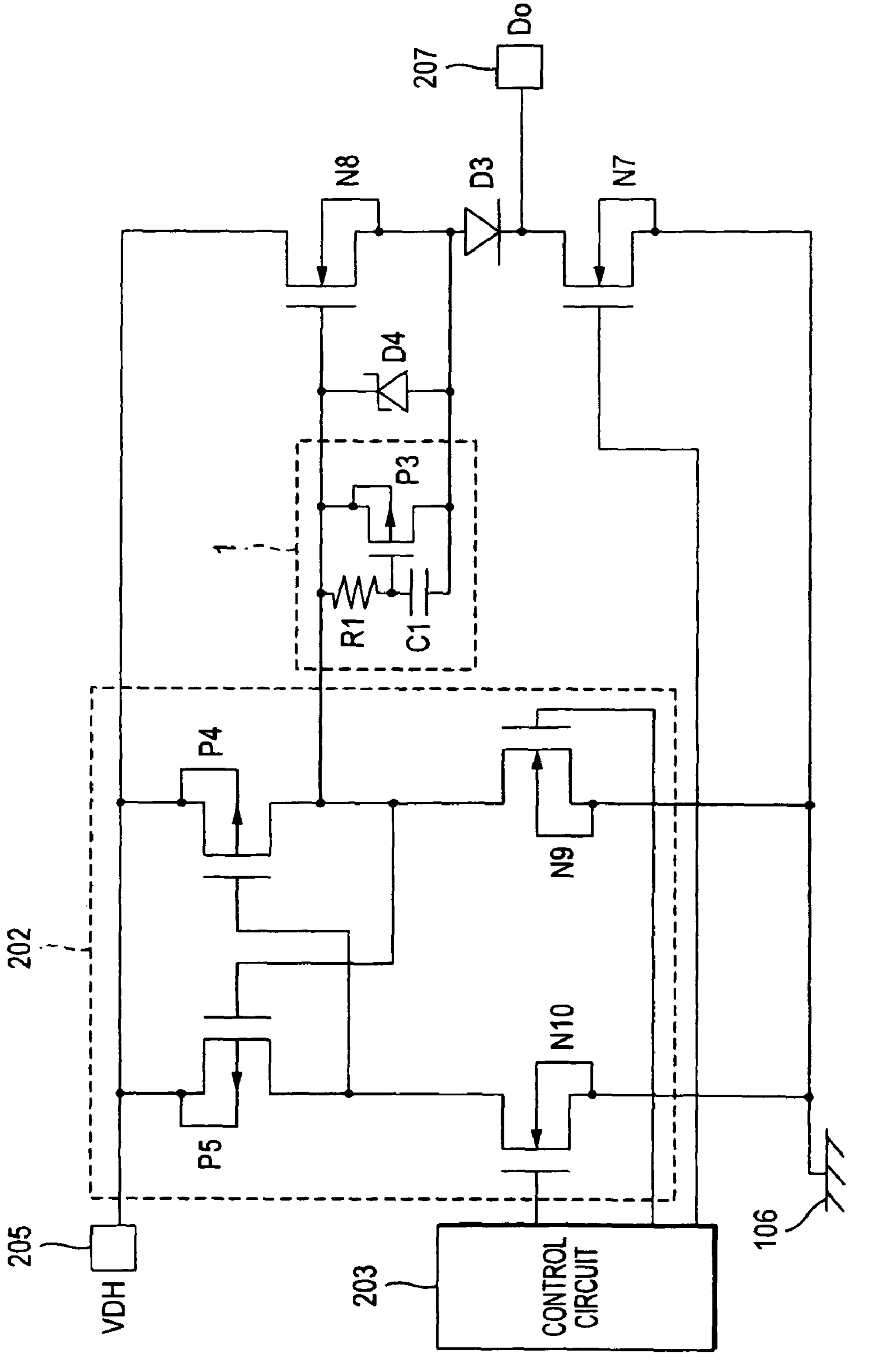
FIG. 16 is a circuit diagram showing a load driving circuit according to a 13th embodiment.

FIG. 16 is a circuit diagram showing the configuration of a load driving circuit according to a 14th embodiment.

The above-described first to 13th embodiments are directed to the case that the transistors N1 and N2 as the main switching elements are n-channel IGBTs. In this embodiment, transistors N7 and N8, which are n-channel MOSFETs, are used in place of the transistors N1 and N2. The transistors N8 and N7 are connected between a drive voltage supply terminal 205 to which a first drive voltage VDH is supplied, and a ground terminal 106 to which a second drive voltage (GND) is supplied. The connecting point of the source of the transistor N8 and the drain of the transistor N7 is connected to an output terminal 207.

Since this embodiment is different from the first embodiment only in that the IGBT transistors N2 and N1 are replaced by the MOSFET transistors N8 and N7, the same control as in the first embodiment is performed in this embodiment. Therefore, transistors N9 and N10 and transistors P4 and P5 of a level shifter section 202 and a control circuit 203 are substantially the same as the transistors N3 and N4 and transistors P1 and P2 of the level shifter section 102 and the control circuit 103 in the first embodiment, respectively. The transistors N8 and N7 are controlled by a low-side signal supplied from the control circuit 203 and a high-side signal supplied from the control circuit 203 via the level shifter section 202. The transistors N8 and N7 are controlled so as to be turned on and off complementarily. To provide high impedance for the output terminal 207, a low-side signal and a high-side signal may be supplied as such control voltages as turn off both of the transistors N7 and N8.

In this embodiment, the above-described protection circuit section 1 according to the first embodiment is provided for the transistor N8 so as to prevent an overcurrent from flowing through the transistor N8. Components having the same components in the first embodiment are given the same reference symbols as the latter. A further detailed description of this embodiment is omitted.

In the 14th embodiment, the above-described protection circuit section 1 according to the first embodiment is provided for the transistor N8. Aside from this configuration, each of the protection circuit sections 2-5 according to the second to fifth embodiments may be provided for the transistor N8 or each of the protection circuit sections 6-10 according to the sixth to 10th embodiments may be provided for the transistor N7.

Furthermore, one of the protection circuit sections 1-5 according to the first to fifth embodiments and one of the protection circuit sections 6-10 according to the sixth to 10th embodiments may be provided for the respective transistors N8 and N7.

Embodiment 15

Figure 17:
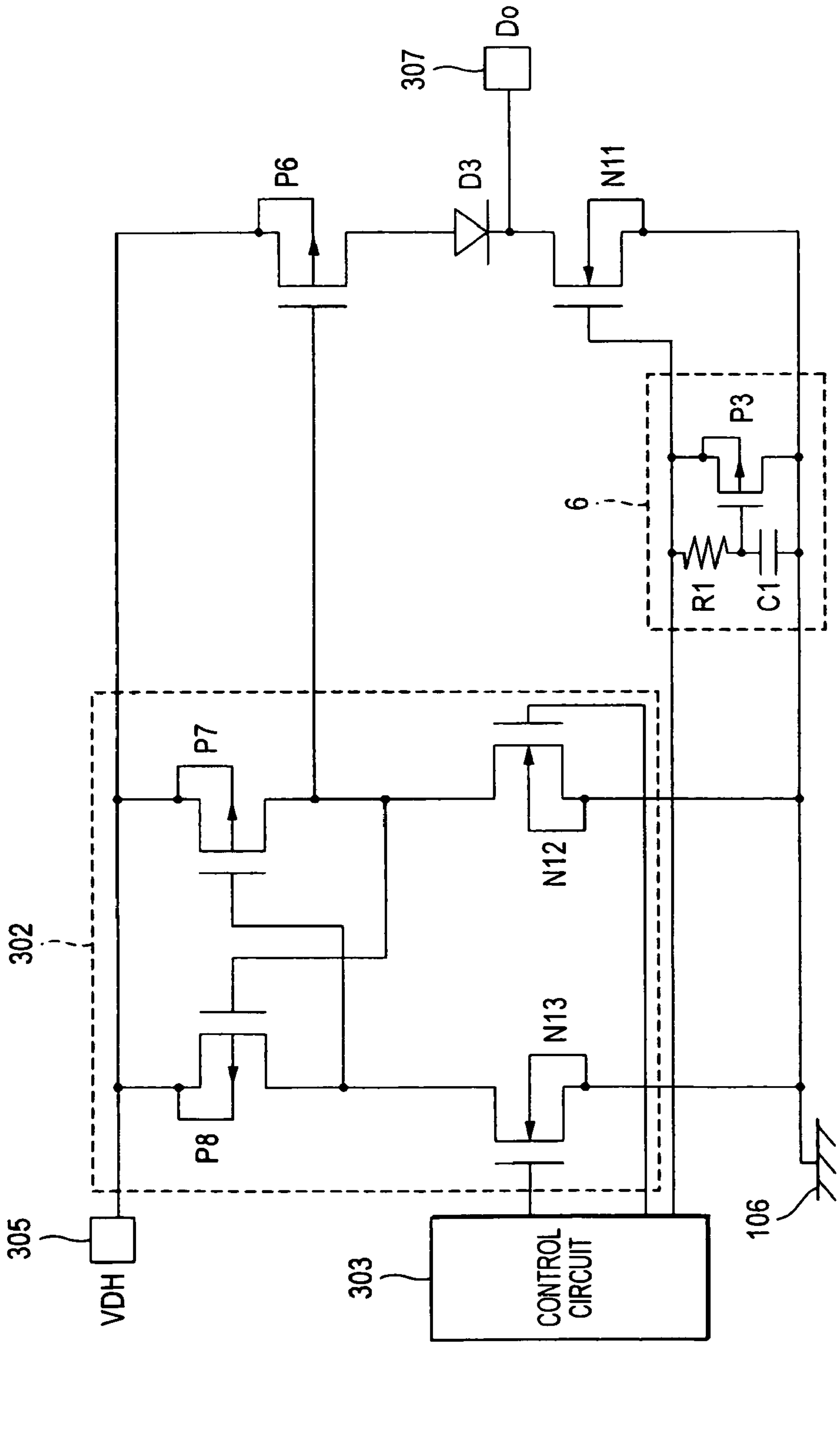
FIG. 17 is a circuit diagram showing a load driving circuit according to a 14th embodiment.

FIG. 17 is a circuit diagram showing the configuration of a load driving circuit according to a 15th embodiment.

The load driving circuit according to the 15th embodiment has a push-pull structure. The high-side main switch element is a transistor P6 which is a p-channel MOSFET and the low-side main switch element is a transistor N11 which is an n-channel MOSFET.

The transistors P6 and N11 are connected between a drive voltage supply terminal 305 to which a first drive voltage VDH is supplied and a ground terminal 106 to which a second drive voltage (GND) is supplied. The connecting point of the drain of the transistor P6 and the drain of the transistor N11 is connected to an output terminal 307.

In this load driving circuit, as in the load driving circuits according to the first to 14th embodiments, a low-side signal is supplied from a control circuit 303 to the transistor N11 and a high-side signal is supplied from the control circuit 303 to the transistor P6 via a level shifter section 302 as such control signals that turn on and off the transistors P6 and N11 complementarily.

To turn off the transistor P6 and turn on the transistor N11, the control circuit 303 supplies signals for turning on a transistor N13 and turning off a transistor N12 and also supplies a signal for turning on the transistor N11. As a result, a transistor P7 is turned on and a transistor P8 is turned off. Since the potential of the control electrode of the transistor P6 becomes equal to VDH, the transistor P6 is turned off. The transistor N11 is turned on. To turn on the transistor P6 and turn off the transistor N11, signals opposite to the above signals are supplied from the control circuit 303.

To provide high impedance for the output terminal 307, a low-side signal and a high-side signal may be supplied as such control voltages as turn off both of the transistors N11 and P6.

In the 15th embodiment, the above-described protection circuit section 6 according to the sixth embodiment is provided for the transistor N11 so as to prevent an overcurrent from flowing through the transistor N11.

In this load driving circuit, any of the above-described protection circuit sections 7-10 according to the seventh to 10th embodiments may be provided for the low-side main transistor N11 in place of the protection circuit section 6.

Embodiment 16

Figure 18:
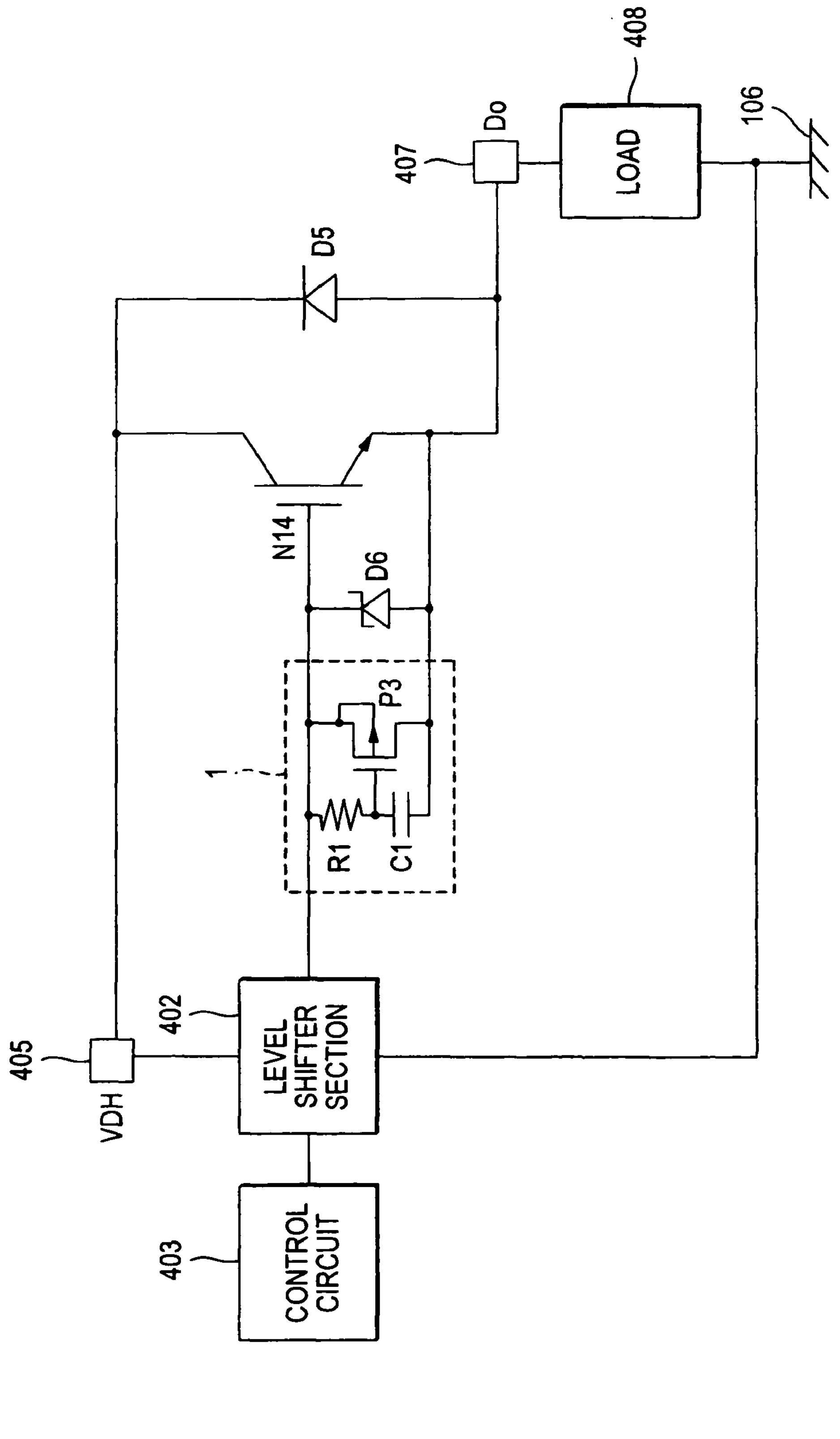
FIG. 18 is a circuit diagram showing a load driving circuit according to a 15th embodiment.

FIG. 18 is a circuit diagram showing the configuration of a load driving circuit according to a 16th embodiment.

A transistor N14 which is an IGBT is connected between a drive voltage supply terminal 405 to which a first drive voltage VDH is supplied and an output terminal 407. A diode D5 is connected, in parallel and in opposite polarity, to the transistor N14. A control circuit 403 controls the potential of the control electrode of the transistor N14. A Zener diode D6 for protecting the gate electrode of the transistor N2 is connected between the gate and the source of the transistor N14.

A control signal supplied from the control circuit 403 is applied to the gate of the transistor N14 via a level shifter section 402. A load 408 is driven by switching the transistor N14 with the control circuit 403.

Also in this load driving circuit, there may occur an event that the potential of the output terminal 407 falls steeply to the ground potential (GND) due to an external surge voltage or noise that is produced by switching of the load 408 which is capacitive or inductive.

The load driving circuit according to the 16th embodiment is provided with the above-described protection circuit section 1 according to the first embodiment. Therefore, no overcurrent flows through the transistor N14 even if the potential of the output terminal 407 falls steeply.

Although in FIG. 18 the protection circuit section 1 is provided, any of the above-described protection circuit sections 2-5 according to the second to fifth embodiment may be provided in place of the protection circuit section 1.

Embodiment 17

Figure 19:
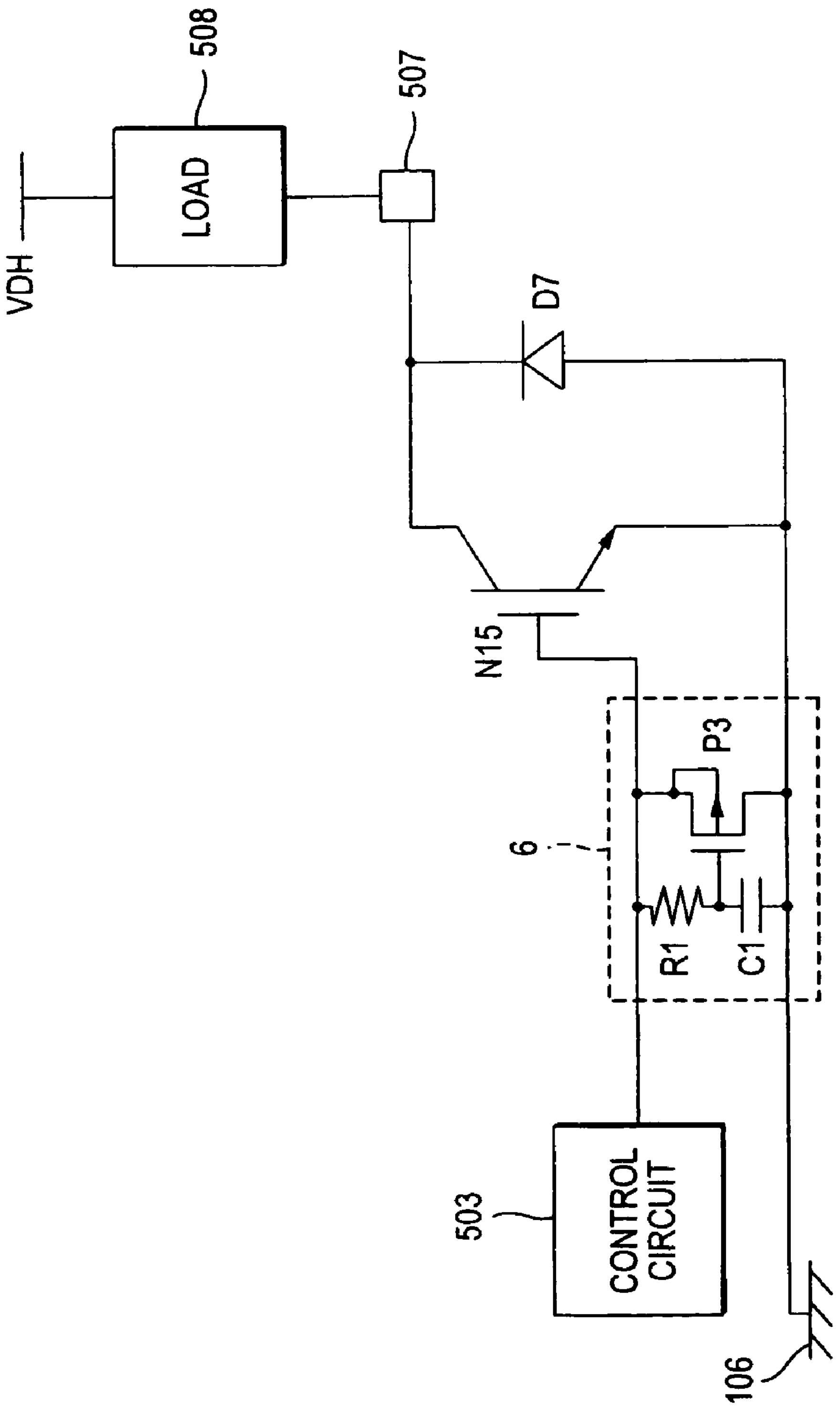
FIG. 19 is a circuit diagram showing a load driving circuit according to a 16th embodiment.
Figure 20:
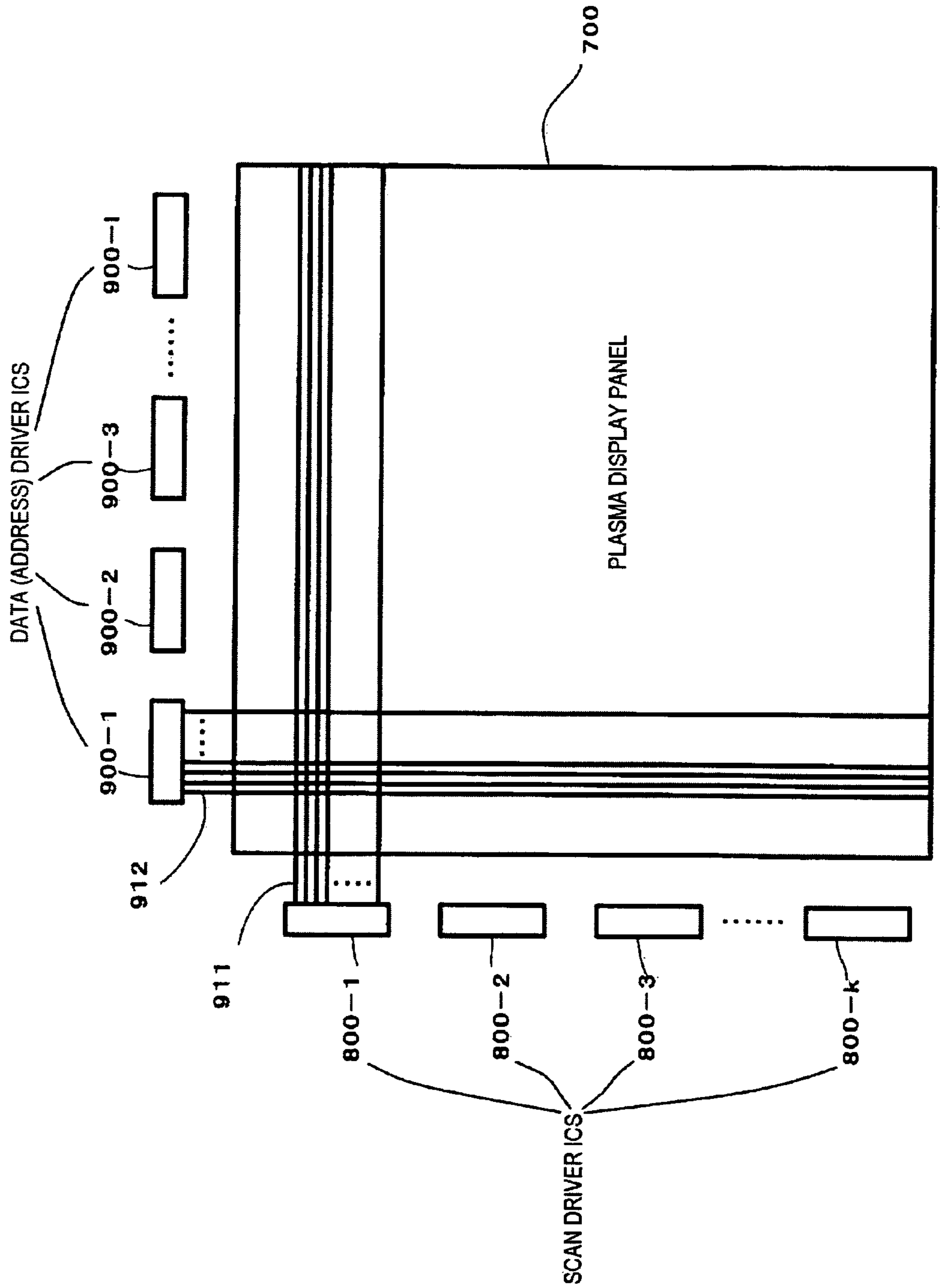
FIG. 20 shows a general configuration of an exemplary PDP driving device.

FIG. 19 is a circuit diagram showing the configuration of a load driving circuit according to a 17th embodiment. This load driving circuit is a low-side switch.

A transistor N15 which is an IGBT is connected between a ground terminal (GND) 106 and an output terminal 507. A diode D7 is connected, in parallel and in opposite polarity, to the transistor N15. A control circuit 503 controls the potential of the control electrode of the transistor N15.

A load 508 which is connected to a high-voltage power source (VDH) is driven by switching the transistor N15 with the control circuit 503.

Also in this load driving circuit, there may occur an event that the potential of the output terminal 507 rises steeply to the high voltage (VDH) due to an external surge voltage or noise that is produced by switching of the load 508 which is capacitive or inductive.

The load driving circuit according to the 17th embodiment is provided with the above-described protection circuit section 6 according to the sixth embodiment. Therefore, no overcurrent flows through the transistor N15 even if the potential of the output terminal 507 rises steeply.

Although in FIG. 19 the protection circuit section 6 is provided, any of the above-described protection circuit sections 7-10 according to the seventh to 10th embodiment may be provided in place of the protection circuit section 6.

What is claimed is:

1. A load driving circuit comprising an output terminal for connection to a load;

two main switch elements, including a low-side main switch element and a high-side main switch element having a totem pole structure and connected between a pair of drive voltage supply lines, at least one of the two main switch elements being connected to the output terminal;

an overvoltage prevention switch configured to connect a control electrode and a low-potential-side control subject electrode of one of the two main switch elements; and a voltage control circuit including voltage-dividing components connected in series, each voltage-dividing component being one of a resistor and a capacitor, the voltage control circuit being configured to turn on the overvoltage prevention switch during a prescribed period at the time of potential variation at the output terminal, a first one of the voltage-dividing components being connected between a control terminal of the overvoltage prevention switch and the low-potential-side control subject electrode of the one main switch element and a second one of the voltage-dividing components being connected between the control terminal of the overvoltage prevention switch and the control electrode of the one main switch element, so that a potential at one end of the first one of the voltage-dividing components is applied at the control terminal of the overvoltage prevention switch and a potential at the other end of the first one of the voltage-dividing components is applied at the low-potential-side control subject electrode of the one main switch element.

2. The load driving circuit according to claim 1, further comprising a Zener diode configured to protect the control electrode of the high-side main switch element from an overvoltage, the Zener diode connected between the control electrode and low-potential-side control subject electrode of the high-side main switch element.

3. The load driving circuit according to claim 1, wherein the one of the two main switch elements is the high-side main switch element;

the overvoltage prevention switch includes a p-channel MOSFET; and the voltage control circuit includes as the voltage-dividing components a resistor and a capacitor, respectively connecting the control electrode and low-potential-side control subject electrode of the high-side main switch element to a gate electrode of the p-channel MOSFET.

4. The load driving circuit according to claim 1, wherein the one of the two main switch elements is the high-side main switch element;

the overvoltage prevention switch includes an n-channel MOSFET; and the voltage control circuit includes as the voltage-dividing components a capacitor and a resistor respectively connecting the control electrode and low-potential-side control subject electrode of the high-side main switch element to a gate electrode of the n-channel MOSFET.

5. The load driving circuit according to claim 1, wherein the one of the two main switch elements is the high-side main switch element;

the overvoltage prevention switch includes a first p-channel or first n-channel MOSFET; and the voltage control circuit includes as the voltage-dividing components a pair of resistors which connect a gate electrode of the first MOSFET to the control electrode and low-potential-side control subject electrode of the high-side main switch element, respectively.

6. The load driving circuit according to claim 5, wherein the overvoltage prevention switch further includes a second MOSFET, the second MOSFET being a p-channel MOSFET; and the voltage control circuit further includes as the voltage-dividing components a resistor and a capacitor respectively connecting the control electrode and low-potential-side control subject electrode of the high-side main switch element to the gate electrode of the second p-channel MOSFET.

7. The load driving circuit according to claim 5, wherein the overvoltage prevention switch further includes a second MOSFET, the second MOSFET being an n-channel MOSFET; and the voltage control circuit further includes as the voltage-dividing components a capacitor and a resistor respectively connecting the control electrode and the low-potential-side control subject electrode of the high-side main switch element to a gate electrode of the second n-channel MOSFET.

8. The load driving circuit according to claim 1, wherein the one of the two main switch elements is the low-side main switch element;

the overvoltage prevention switch includes a p-channel MOSFET; and the voltage control circuit includes as the voltage-dividing components a resistor and a capacitor respectively connecting the control electrode and low-potential-side control subject electrode of the low-side main switch element to a gate electrode of the p-channel MOSFET.

9. The load driving circuit according to claim 1, wherein the one of the two main switch elements is the low-side main switch element;

the overvoltage prevention switch includes an n-channel MOSFET; and the voltage control circuit includes as the voltage-dividing components a capacitor and a resistor respectively connecting the control electrode and low-potential-side control subject electrode of the low side main switch element to a gate electrode of the n-channel MOSFET.

10. The load driving circuit according to claim 1, wherein the one of the two main switch elements is the low-side main switch element;

the overvoltage prevention switch includes a first p-channel or first n-channel MOSFET;

the voltage control circuit includes as the voltage-dividing components a pair of resistors which connect a gate electrode of the first MOSFET to the control electrode and low-potential-side control subject electrode of the low-side main switch element, respectively; and a voltage division ratio of the pair of resistors is determined so that the first MOSFET is turned on even if a width of the voltage variation at the output terminal is lower than a drive voltage which is supplied from the pair of drive voltage supply lines.

11. The load driving circuit according to claim 10, wherein the overvoltage prevention switch further includes a second MOSFET, the second MOSFET being a p-channel MOSFET; and the voltage control circuit further includes as the voltage-dividing components a resistor and a capacitor respectively connecting the control electrode and low-potential-side control subject electrode of the low-side main switch element to a gate electrode of the second p-channel MOSFET.

12. The load driving circuit according to claim 10, wherein the overvoltage prevention switch further includes a second MOSFET being an n-channel MOSFET; and the voltage control circuit further includes as the voltage-dividing components a capacitor and a resistor respectively connecting the control electrode and low-potential-side control subject electrode of the low-side main switch element to a gate electrode of the second n-channel MOSFET.

13. The load driving circuit according to claim 1, wherein the load driving circuit is included within a single integrated circuit.

14. A drive device for driving a plasma display panel, comprising a plurality of the load driving circuits according to claim 13, each connected with a scanning electrode of the plasma display panel.

15. A load driving circuit, comprising an output terminal for connection to a load;

two main switch elements, including a low-side main switch element and a high-side main switch element having a push-pull structure and connected between a pair of drive voltage supply lines, at least one of the two main switch elements being connected to the output terminal;

a high-side overvoltage prevention switch configured to connect a control electrode and a low-potential-side control subject electrode of the high-side main switch element;

a high-side voltage control circuit including high-side voltage-dividing components connected in series, each high-side voltage-dividing component being one of a resistor and a capacitor, the high-side voltage control circuit being configured to turn on the high-side overvoltage prevention switch during a prescribed period at the time of potential variation at the output terminal, a first one of the high-side voltage-dividing components being connected between a control terminal of the high-side overvoltage prevention switch and the low-potential-side control subject electrode of the high-side main switch element and a second one of the high-side voltage-dividing components being connected between the control terminal of the high-side overvoltage prevention switch and the control electrode of the high-side main switch element, so that a potential at one end of the first one of the high-side voltage-dividing components is applied at the control terminal of the high-side overvoltage prevention switch and a potential at the other end of the first one of the high-side voltage-dividing components is applied at the low-potential-side control subject electrode of the high-side main switch element;

a low-side overvoltage prevention switch configured to connect a control electrode and a low-potential-side control subject electrode of the low-side main switch element; and a low-side voltage control circuit including low-side voltage-dividing components connected in series, each low-side voltage-dividing component being one of a resistor and a capacitor, the low-side voltage control circuit being configured to turn on the low-side overvoltage prevention switch during a prescribed period at the time of potential variation at the output terminal, a first one of the low-side voltage-dividing components being connected between a control terminal of the low-side overvoltage prevention switch and the low-potential-side control subject electrode of the low-side main switch element and a second one of the low-side voltage-dividing components being connected between the control terminal of the low-side overvoltage prevention switch and the control electrode of the low-side main switch element, so that a potential at one end of the first one of the low-side voltage-dividing components is applied at the control terminal of the low-side overvoltage prevention switch and a potential at the other end of the first one of the low-side voltage-dividing components is applied at the low-potential-side control subject electrode of the low-side main switch element.

16. The load driving circuit according to claim 15, further comprising a Zener diode configured to protect the control electrode of the high-side main switch element from an overvoltage, the Zener diode connected between the control electrode and low-potential-side control subject electrode of the high-side main switch element.

17. The load driving circuit according to claim 15, wherein the low-side overvoltage prevention switch includes a p-channel MOSFET; and the low-side voltage control circuit includes as the low-side voltage-dividing components a resistor and a capacitor respectively connecting the control electrode and low-potential-side control subject electrode of the low-side main switch element to a gate electrode of the p-channel MOSFET.

18. The load driving circuit according to claim 15, wherein the low-side overvoltage prevention switch includes an n-channel MOSFET; and the low-side voltage control circuit includes as the low-side voltage-dividing components a capacitor and a resistor respectively connecting the control electrode and low-potential-side control subject electrode of the low-side main switch element to a gate electrode of the n-channel MOSFET.

19. The load driving circuit according to claim 15, wherein the low-side overvoltage prevention switch includes a p-channel or n-channel MOSFET;

the low-side voltage control circuit includes as the low-side voltage-dividing components a pair of resistors which connect a gate electrode of the MOSFET to the control electrode and low-potential-side control subject electrode of the low-side main switch element, respectively; and a voltage division ratio of the pair of resistors is determined so that the second MOSFET is turned on even if a width of the voltage variation at the output terminal is lower than a drive voltage which is supplied from the pair of drive voltage supply lines.

20. The load driving circuit according to claim 19, wherein the low-side overvoltage prevention switch further includes a second MOSFET, the second MOSFET being a p-channel MOSFET; and the low-side voltage control circuit further includes as the low-side voltage-dividing components a resistor and a capacitor respectively connecting the control electrode and low-potential-side control subject electrode of the low-side main switch element to a gate electrode of the second p-channel MOSFET.

21. The load driving circuit according to claim 19, wherein the low-side overvoltage prevention switch further includes a second MOSFET, the second MOSFET being an n-channel MOSFET; and the low-side voltage control circuit further includes as the low-side voltage-dividing components a capacitor and a resistor respectively connecting the control electrode and low-potential-side control subject electrode of the low-side main switch element to a gate electrode of the second n-channel MOSFET.

22. The load driving circuit according to claim 15, wherein the load driving circuit is included within a single integrated circuit.

23. A drive device for driving a plasma display panel, comprising a plurality of the load driving circuits according to claim 22, each connected with a scanning electrode of the plasma display panel.

24. A load driving circuit, comprising an output terminal for connection to a load;

a high-side main switch element connected to the output terminal;

an overvoltage prevention switch configured to connect a control electrode and a low-potential-side control subject electrode of the high-side main switch element; and a voltage control circuit including voltage-dividing components connected in series, each voltage-dividing component being one of a resistor and a capacitor, the voltage control circuit being configured to turn on the overvoltage prevention switch during a prescribed period at the time of potential variation at the output terminal, a first one of the voltage-dividing components being connected between a control terminal of the overvoltage prevention switch and the low-potential-side control subject electrode of the high-side main switch element and a second one of the voltage-dividing components being connected between the control terminal of the overvoltage prevention switch and the control electrode of the high-side main switch element, so that a potential at one end of the first one of the voltage-dividing components is applied at the control terminal of the overvoltage prevention switch and a potential at the other end of the first one of the voltage-dividing components is applied at the low-potential-side control subject electrode of the high-side main switch element.

25. The load driving circuit according to claim 24, further comprising a Zener diode configured to protect the control electrode of the high-side main switch element from an overvoltage, the Zener diode connected between the control electrode and low-potential-side control subject electrode of the high-side main switch element.

26. The load driving circuit according to claim 24, wherein the overvoltage prevention switch includes a p-channel MOSFET; and the voltage control circuit includes as the voltage-dividing components a resistor and a capacitor, respectively connecting the control electrode and low-potential-side control subject electrode of the high-side main switch element to a gate electrode of the p-channel MOSFET.

27. The load driving circuit according to claim 24, wherein the one of the two main switch elements is the high-side main switch element;

the overvoltage prevention switch includes an n-channel MOSFET; and the voltage control circuit includes as the voltage-dividing components a capacitor and a resistor respectively connecting the control electrode and low-potential-side control subject electrode of the high-side main switch element to a gate electrode of the n-channel MOSFET.

28. The load driving circuit according to claim 24, wherein the overvoltage prevention switch includes a first p-channel or first n-channel MOSFET; and the voltage control circuit includes as the voltage-dividing components a pair of resistors which connect a gate electrode of the first MOSFET to the control electrode and low-potential-side control subject electrode of the high-side main switch element, respectively.

29. The load driving circuit according to claim 28, wherein the overvoltage prevention switch further includes a second MOSFET, the second MOSFET being a p-channel MOSFET; and the voltage control circuit further includes as the voltage-dividing components a resistor and a capacitor respectively connecting the control electrode and low-potential-side control subject electrode of the high-side main switch element to the gate electrode of the second p-channel MOSFET.

30. The load driving circuit according to claim 28, wherein the overvoltage prevention switch further includes a second MOSFET, the second MOSFET being an n-channel MOSFET; and the voltage control circuit further includes as the voltage-dividing components a capacitor and a resistor respectively connecting the control electrode and the low-potential-side control subject electrode of the high-side main switch element to a gate electrode of the second n-channel MOSFET.

31. A load driving circuit, comprising an output terminal for connection to a load;

a low-side main switch element having a high-potential-side control subject electrode connected to the output terminal;

an overvoltage prevention switch configured to connect a control electrode and the low-potential-side control subject electrode of the low-side main switch element; and a voltage control circuit including voltage-dividing components connected in series, each voltage-dividing component being one of a resistor and a capacitor, the voltage control circuit being configured to turn on the overvoltage prevention switch during a prescribed period at the time of potential variation at the output terminal, a first one of the voltage-dividing components being connected between a control terminal of the overvoltage prevention switch and the low-potential-side control subject electrode of the low-side main switch element and a second one of the voltage-dividing components being connected between the control terminal of the overvoltage prevention switch and the control electrode of the low-side main switch element, so that a potential at one end of the first one of the voltage-dividing components is applied at the control terminal of the overvoltage prevention switch and a potential at the other end of the first one of the voltage-dividing components is applied at the low-potential-side control subject electrode of the low-side main switch element.

32. The load driving circuit according to claim 31, wherein the overvoltage prevention switch includes a p-channel MOSFET; and the voltage control circuit includes as the voltage-dividing components a resistor and a capacitor respectively connecting the control electrode and low-potential-side control subject electrode of the low-side main switch element to a gate electrode of the p-channel MOSFET.

33. The load driving circuit according to claim 31, wherein the overvoltage prevention switch includes an n-channel MOSFET; and the voltage control circuit includes as the voltage-dividing components a capacitor and a resistor respectively connecting the control electrode and low-potential-side control subject electrode of the low-side main switch element to a gate electrode of the n-channel MOSFET.

34. The load driving circuit according to claim 31, wherein the overvoltage prevention switch includes a first p-channel or first n-channel MOSFET;

the voltage control circuit includes as the voltage-dividing components a pair of resistors which connect a gate electrode of the MOSFET to the control electrode and low-potential-side control subject electrode of the low-side main switch element, respectively; and a voltage division ratio of the pair of resistors is determined so that the first MOSFET is turned on even if a width of the voltage variation at the output terminal is lower than a drive voltage which is supplied from the pair of drive voltage supply lines.

35. The load driving circuit according to claim 34, wherein the overvoltage prevention switch further includes a second MOSFET, the second MOSFET being a p-channel MOSFET; and the voltage control circuit further includes as the voltage-dividing components a resistor and a capacitor respectively connecting the control electrode and low-potential-side control subject electrode of the low-side main switch element to a gate electrode of the second p-channel MOSFET.

36. The load driving circuit according to claim 34, wherein the overvoltage prevention switch further includes a second MOSFET, the second MOSFET being an n-channel MOSFET; and the voltage control circuit further includes as the voltage-dividing components a capacitor and a resistor respectively connecting the control electrode and low-potential-side control subject electrode of the low-side main switch element to a gate electrode of the second n-channel MOSFET.

* * * * *